(12) United States Patent
Maeda et al.

(10) Patent No.: US 10,179,509 B2
(45) Date of Patent: Jan. 15, 2019

(54) COOLING DEVICE AND COOLING MODULE

(71) Applicant: DENSO CORPORATION, Kariya, Aichi-pref. (JP)

(72) Inventors: Akihiro Maeda, Kariya (JP); Takashi Yasuda, Kariya (JP); Koichi Harada, Kariya (JP); Ken Mutou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/525,775

(22) PCT Filed: Dec. 4, 2015

(86) PCT No.: PCT/JP2015/006040
§ 371 (c)(1),
(2) Date: May 10, 2017

(87) PCT Pub. No.: WO2016/092795
PCT Pub. Date: Jun. 16, 2016

(65) Prior Publication Data
US 2018/0086198 A1 Mar. 29, 2018

(30) Foreign Application Priority Data

Dec. 9, 2014 (JP) .................................. 2014-249101
Apr. 3, 2015 (JP) .................................. 2015-076860

(51) Int. Cl.
*B60K 11/06* (2006.01)
*F01P 5/06* (2006.01)
(Continued)

(52) U.S. Cl.
CPC .............. *B60K 11/06* (2013.01); *B60K 11/04* (2013.01); *B60K 13/04* (2013.01); *F01P 5/06* (2013.01); *F01P 11/10* (2013.01)

(58) Field of Classification Search
CPC .............................. B60K 11/06; B60K 11/08
See application file for complete search history.

(56) References Cited

U.S. PATENT DOCUMENTS

| 4,598,786 A * | 7/1986 | Kirchweger | ........... B60K 11/08 |
| | | | 180/68.1 |
| 5,588,482 A * | 12/1996 | Holka | .................... B60K 11/08 |
| | | | 123/41.49 |

(Continued)

FOREIGN PATENT DOCUMENTS

| JP | S59110326 U | 7/1984 |
| JP | S59182427 U | 12/1984 |

(Continued)

*Primary Examiner* — Erez Gurari
(74) *Attorney, Agent, or Firm* — Harness, Dickey & Pierce, P.L.C.

(57) ABSTRACT

A cooling device for an automobile that includes a front opening opened in a front engine room, a first air blower arranged in the front engine room on a front side of a drive engine, and an introduction passage for guiding, toward the first air blower, air to flow from the front side of the front opening through the front opening is configured to cool the drive engine with the air flow passing from the introduction passage to the drive engine via the first air blower. The cooling device includes a duct having a first opening opened in the introduction passage and a second opening opened to rear of the drive engine in the front engine room, to form an air passage for air to flow between the first opening and the second opening.

30 Claims, 14 Drawing Sheets

(51) Int. Cl.
  *F01P 11/10* (2006.01)
  *B60K 11/04* (2006.01)
  *B60K 13/04* (2006.01)

(56) References Cited

U.S. PATENT DOCUMENTS

| | | | | |
|---|---|---|---|---|
| 6,192,838 | B1 * | 2/2001 | Matsuo | B60K 11/08 |
| | | | | 123/41.01 |
| 6,302,228 | B1 * | 10/2001 | Cottereau | B60K 11/08 |
| | | | | 180/68.1 |
| 6,786,291 | B1 * | 9/2004 | Linden | B62D 21/02 |
| | | | | 123/41.56 |
| 9,669,729 | B2 * | 6/2017 | Ohashi | B60L 11/1883 |
| 9,770,973 | B1 * | 9/2017 | Vaddiraju | B60K 11/08 |
| 2003/0121638 | A1 * | 7/2003 | Molari | B60H 1/00535 |
| | | | | 165/41 |
| 2005/0051372 | A1 * | 3/2005 | Guertler | B60K 11/06 |
| | | | | 180/68.1 |
| 2008/0099261 | A1 * | 5/2008 | Sturmon | B60K 11/08 |
| | | | | 180/68.1 |
| 2012/0111653 | A1 * | 5/2012 | Stuckey | B60K 11/08 |
| | | | | 180/68.3 |
| 2013/0139997 | A1 * | 6/2013 | Murakami | B60K 11/06 |
| | | | | 165/41 |
| 2013/0248141 | A1 * | 9/2013 | Maurer | B60K 11/08 |
| | | | | 165/44 |
| 2015/0041229 | A1 * | 2/2015 | Maurer | B60K 11/06 |
| | | | | 180/68.1 |
| 2015/0291019 | A1 * | 10/2015 | Hatta | B60K 11/06 |
| | | | | 180/68.2 |
| 2016/0294026 | A1 * | 10/2016 | Tsuchiya | B60K 11/06 |
| 2017/0050509 | A1 * | 2/2017 | Aizawa | B60K 11/085 |
| 2017/0233010 | A1 * | 8/2017 | Sytsma | B60K 11/08 |
| | | | | 296/187.09 |
| 2017/0349040 | A1 * | 12/2017 | Nagaosa | B60K 1/04 |

FOREIGN PATENT DOCUMENTS

| | | |
|---|---|---|
| JP | H03050523 U | 5/1991 |
| JP | H05169986 A | 7/1993 |
| JP | H08100646 A | 4/1996 |
| JP | H10067340 A | 3/1998 |
| JP | 2001080370 A | 3/2001 |
| JP | 2007055274 A | 3/2007 |
| JP | 2007099182 A | 4/2007 |
| JP | 2007290625 A | 11/2007 |

* cited by examiner

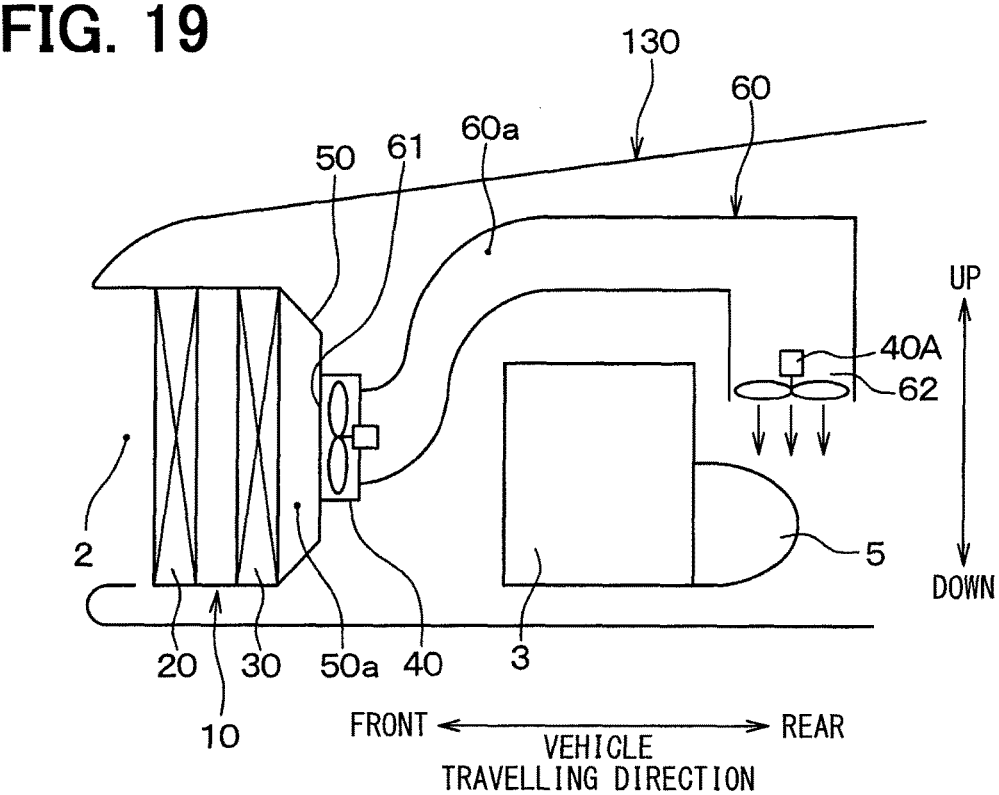
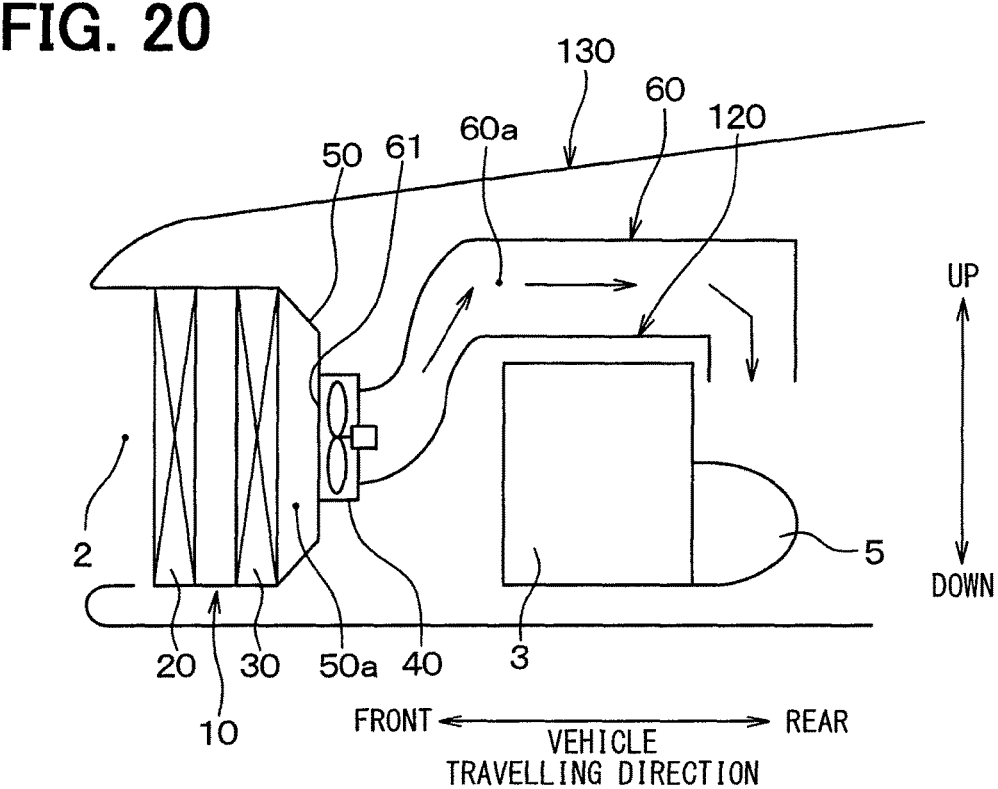

COOLING DEVICE AND COOLING MODULE

CROSS REFERENCE TO RELATED APPLICATIONS

This application is a U.S. National Phase Application under 35 U.S.C. 371 of International Application No. PCT/JP2015/006040 filed on Dec. 4, 2015 and published in Japanese as WO 2016/092795 A1 on Jun. 16, 2016. This application is based on and claims the benefit of priority from Japanese Patent Application No. 2014-249101 filed on Dec. 9, 2014 and Japanese Patent Application No. 2015-76860 filed on Apr. 3, 2015. The entire disclosures of all of the above applications are incorporated herein by reference.

TECHNICAL FIELD

The present disclosure relates to a cooling device and a cooling module.

BACKGROUND ART

A cooling device has been proposed, which is applied to an automobile having an exhaust manifold arranged front of a drive engine in the travelling direction in a front engine room, for cooling the exhaust manifold with air flow (refer to, for example, Patent Literature 1).

The cooling device has a duct formed therein. The duct causes a flow of air, which is introduced from an opening of a front grille and passes through a radiator, to pass around the exhaust manifold, and then guides the flow of air to a region below a rear portion of the drive engine. With this configuration, the exhaust manifold is cooled with the air that passes through the radiator and then passes around the exhaust manifold.

PRIOR ART LITERATURES

Patent Literature

Patent Literature 1: JP H05-169986 A

SUMMARY OF INVENTION

In an automobile having an exhaust manifold arranged front of a drive engine, a cooling device disclosed in Patent Literature 1 may cool the exhaust manifold with air flow. In an automobile having an exhaust manifold arranged rear of a drive engine, however, the cooling device fails to cool the exhaust manifold with air flow.

In a recent automobile having an exhaust manifold arranged front of a drive engine, a front engine room has a narrow air passage due to a reduction in area of the front engine room. This makes ventilation in the front engine room poor, which may result in heat accumulation in the front engine room on a rear side relative to the drive engine in the travelling direction.

An object of the present disclosure is to provide a cooling device and a cooling module each configured to cool a rear side of a front engine room relative to a drive engine in a vehicle travelling direction.

According to an aspect of the present disclosure, for an automobile that includes: a front opening opened in a front engine room on a front side in a travelling direction; a first air blower arranged front of a drive engine in the travelling direction in the front engine room; and an introduction passage for guiding, toward the first air blower, air to flow from the front side of the front opening in the travelling direction through the front opening, a cooling device is configured to cool the drive engine with the air flow passing from the introduction passage to the drive engine via the first air blower. The cooling device includes a duct having a first opening opened in the introduction passage and a second opening opened rear of the drive engine in the travelling direction in the front engine room, to form an air passage for air to flow between the first opening and the second opening.

With this configuration, air flowing into the introduction passage through the front opening with travelling of the automobile can be blown to the rear side, relative to the drive engine in the travelling direction, of the front engine room, through the duct. Thus, the air flow can cool the rear side relative to the drive engine in the travelling direction.

The exhaust manifold is a multi-pipe for collecting a plurality of exhaust passages connected to the drive engine together in an exhaust pipe that emits exhaust gas from the drive engine. The front engine room is a space which is arranged front of a passenger compartment of the automobile in the travelling direction and in which a drive engine is mounted. A thermal medium is a substance for transferring heat.

Specifically, in a state where the drive engine stops, with the activation of the first air blower, the duct sucks air flow from the rear side of the front engine room relative to the drive engine in the travelling direction, through the second opening, and blows the air flow through the first opening into the introduction passage.

Accordingly, in the state where the drive engine stops, air flow is generated to pass from the rear side of the front engine room relative to the drive engine in the travelling direction, to the introduction passage through the duct. As a result, heat of the rear side of the front engine room relative to the drive engine in the travelling direction can be transferred to the introduction passage. Therefore, the rear side of the front engine room relative to the drive engine in the travelling direction can be cooled in such a manner that the heat is sucked toward the introduction passage.

According to an aspect of the present disclosure, a cooling module for an automobile including an exhaust manifold arranged rear of the drive engine in the travelling direction in the front engine room includes: a cooling device; and a heat exchanger arranged on an upstream side of the introduction passage relative to the first air blower in an air-flowing direction, and configured to emit heat from a thermal medium for cooling the drive engine, into the air flow in the introduction passage. The first opening is opened on a downstream side of the introduction passage relative to the heat exchanger in the air-flowing direction.

With this configuration, the duct can take the air flow from the downstream side of the introduction passage relative to the heat exchanger in the air-flowing direction, and blow the taken air flow into the exhaust manifold. Thus, the exhaust manifold can be cooled with the air flow.

According to an aspect of the present disclosure, a cooling device includes a first air outlet from which air flow is blown to a region between the first opening and the second opening in the duct. The air flow blown from the first air outlet lowers an air pressure in the region between the first opening and the second opening in the duct, so that air flow from the first opening to the second opening is generated. The generated air flow and the air flow blown from the first air outlet flow toward the second opening.

With this configuration, the quantity of air blown from the first opening of the duct to the rear side of the front engine room relative to the drive engine in the travelling direction can be increased without increasing the size of the duct. This can reliably cool the rear side of the front engine room relative to the drive engine in the travelling direction.

It should be noted that the air-flowing direction in the introduction passage is a direction of main air flow having the largest quantity of air, among a plurality of air flows in the introduction passage.

BRIEF DESCRIPTION OF DRAWINGS

The above and other objects, features and advantages of the present disclosure will become more apparent from the following detailed description made with reference to the accompanying drawings.

FIG. 19 illustrates inside of a cooling module according to a sixth embodiment.

FIG. 20 illustrates a cooling module according to a first modification.

DESCRIPTION OF EMBODIMENTS

Figure 1:
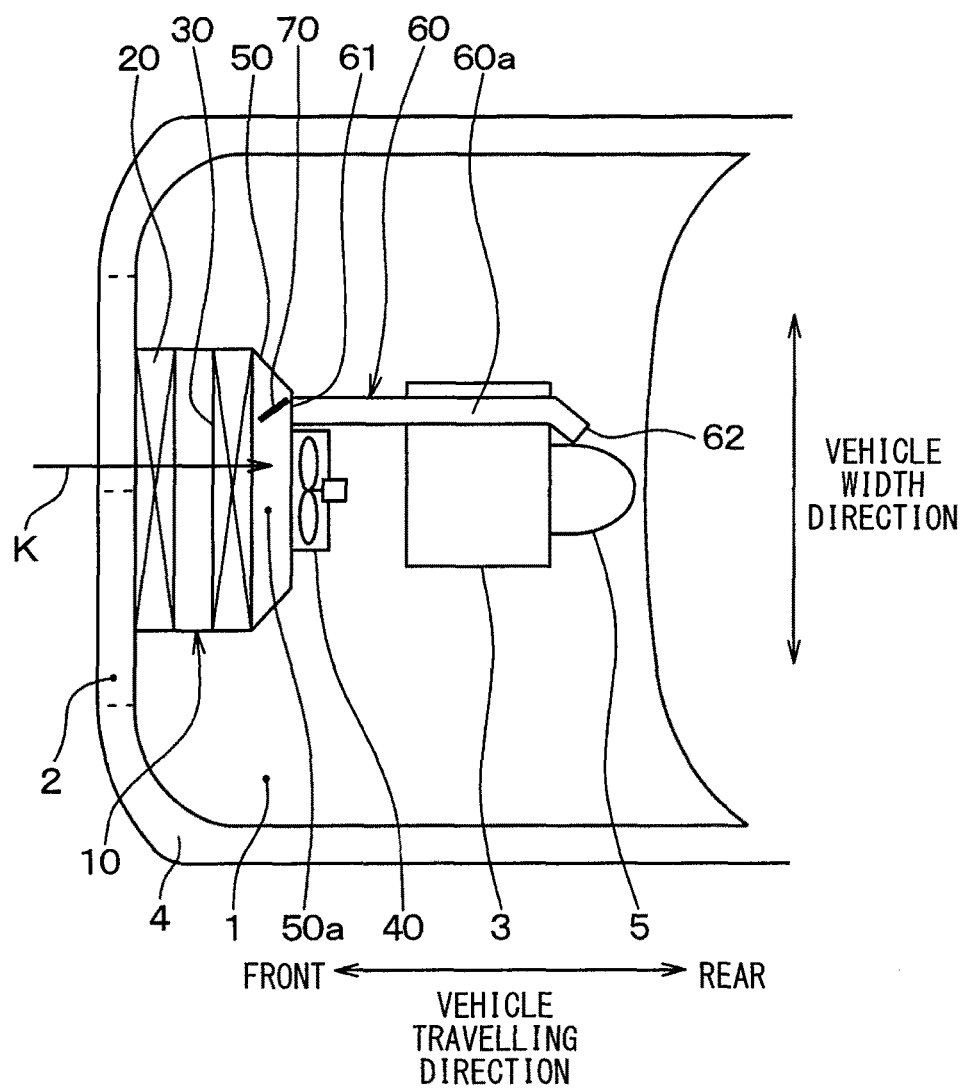
FIG. 1 schematically illustrates a general configuration of a cooling module according to a first embodiment as viewed from above in a vertical direction.

Hereinafter, embodiments will be described according to the drawings. Same or equivalent portions among respective embodiments below are labeled with same reference numerals in the drawings for making the explanation easier.

First Embodiment

FIG. 1 illustrates a cooling module 10 according to a first embodiment, for an automobile to which a cooling device of the present disclosure is applied.

The cooling module 10 according to the present embodiment is arranged between a front grille opening 2 and a drive engine 3 in a front engine room 1 of an automobile. The front grille opening 2 is an opening in a front grille 4 of the automobile, and is opened at a front side of the front grille 4 in a vehicle-travelling direction with respect to the front engine room 1. The front engine room 1 is a space defined front of a passenger compartment of the automobile in the vehicle-travelling direction, the drive engine 3 is arranged in the front engine room 1.

Specifically, as illustrated in FIG. 1, the cooling module 10 includes a condenser 20, a radiator 30, an electric fan 40, a shroud 50, a duct 60, and a valve 70.

The condenser 20 is arranged rear of the front grille opening 2 in the vehicle-travelling direction. The condenser 20 is a heat exchanger of a refrigeration cycle device for an air conditioner, which includes a compressor for circulating refrigerant, a pressure reducing valve, and an evaporator, to cool a high-pressure refrigerant ejected from the compressor, with air outside the automobile (hereinafter, referred to as outside air).

The radiator 30 is arranged rear of the condenser 20 in the vehicle-travelling direction. The radiator 30 is a heat exchanger that cools cooling water for the drive engine 3, with outside air. The radiator 30 is arranged on an upstream side of an introduction passage 50a relative to the electric fan 40 in an air-flowing direction. The introduction passage 50a is an air passage for guiding air flow sucked from the front grille opening 2 to the electric fan 40 through the condenser 20 and the radiator 30 as shown with an arrow K in FIG. 1. The air-flowing direction in the introduction passage 50a is a direction of a main flow with the largest quantity of air among a plurality of air flows in the introduction passage 50a.

The electric fan 40 is arranged rear of the radiator 30 in the vehicle-travelling direction in the front engine room 1. The electric fan 40 generates air flow passing through the condenser 20 and the radiator 30 via the front grille opening 2 on the front side of the automobile in the vehicle-travelling direction.

The shroud 50 is a casing that forms the introduction passage 50a for guiding the air flow sucked from the front grille opening 2 to the electric fan 40 via the condenser 20 and the radiator 30. The shroud 50 covers a region between the condenser 20 and the radiator 30 and a region between the radiator 30 and the electric fan 40 in a vehicle width direction and a vertical direction.

Figure 2:
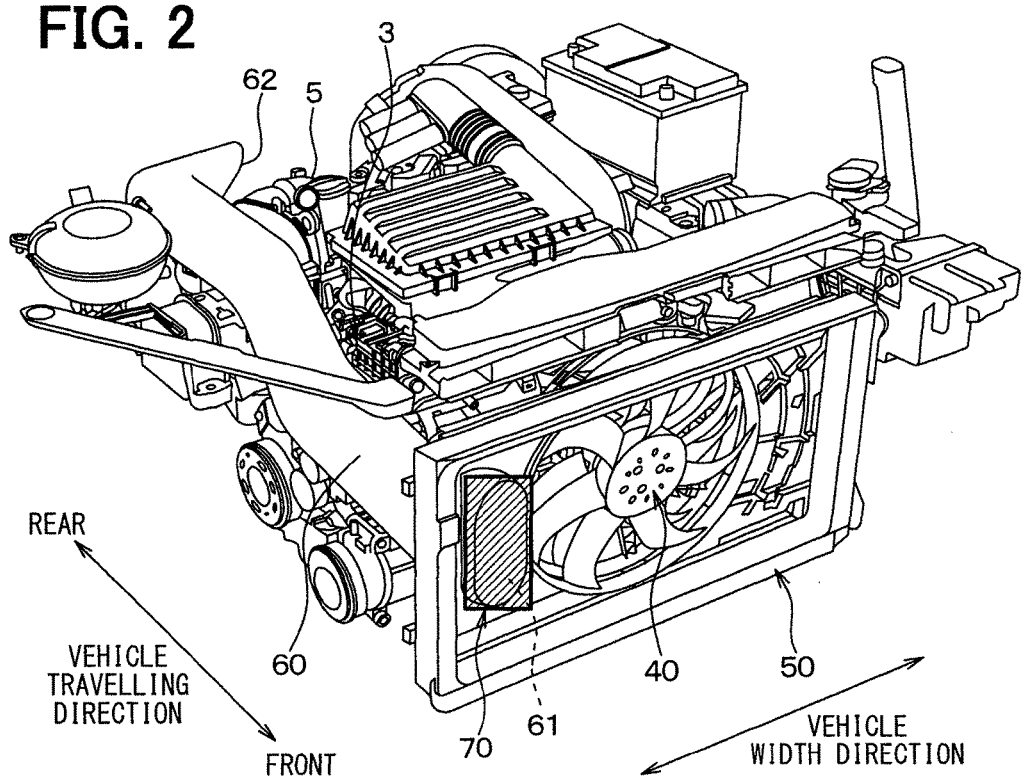
FIG. 2 is a perspective view illustrating a duct, a shroud, a valve, an electric fan, and a drive engine in FIG. 1.
Figure 3:
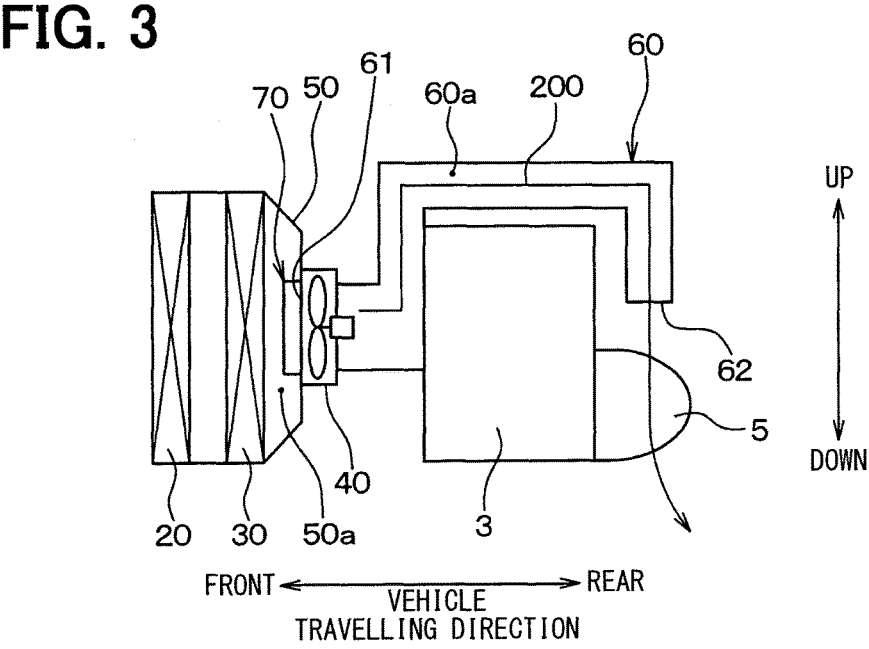
FIG. 3 is a side view illustrating the duct, the shroud, the valve, the electric fan, the drive engine, an introduction passage, and an exhaust manifold in FIG. 1, and illustrates air flow from the introduction passage to the exhaust manifold.

The duct 60 forms an air passage 60a that causes the air flow to pass between a front opening 61 (first opening) and a rear opening 62 (second opening). The duct 60 is arranged above the drive engine 3 in the vertical direction. As illustrated in FIGS. 1 to 3, the front opening 61 is formed on a rear side of the shroud 50 relative to the radiator 30 in the vehicle-travelling direction so as to be opened toward the radiator 30 (that is, toward a front side of the air passage 60a in the vehicle-travelling direction). In other words, the front opening 61 is opened on a downstream side of the introduction passage 50a relative to the radiator 30 in the air-flowing direction. The front opening 61 is arranged on one side relative to the electric fan 40 in the vehicle width direction. The rear opening 62 is opened on a side closer to an exhaust manifold 5 relative to the drive engine 3 in the front engine room 1 (that is, rearward of the drive engine 3 in the vehicle-travelling direction).

The exhaust manifold 5 causes a plurality of exhaust passages connected to the drive engine 3 to join with one another, in an exhaust pipe that discharges exhaust gas from the drive engine 3. The exhaust manifold 5 is arranged rear of the drive engine 3 in the vehicle-travelling direction in the front engine room 1.

In the present embodiment, in addition to the exhaust manifold 5, a turbocharger turbine and a catalyzer are arranged rear of the drive engine 3 in the vehicle-travelling direction in the front engine room 1. The catalyzer purifies by reduction and oxidation hazardous components in exhaust gas discharged from the drive engine 3. A turbocharger extracts rotational energy from internal energy of exhaust gas discharged from the drive engine 3, using the turbine. Moreover, the turbocharger activates the compressor with the rotational energy to generate compressed air, and then supplies the compressed air to an air inlet of the drive engine 3. The turbocharger turbine extracts the rotational energy from internal energy of exhaust gas.

The valve 70 is supported on a side closer to the opening 61 in the duct 60 so as to open and close the opening 61. The valve 70 thus opens and closes the air passage 60a formed of the duct 60. As will be described later, the valve 70 is driven by an electric motor 80 (see FIG. 4).

Figure 4:
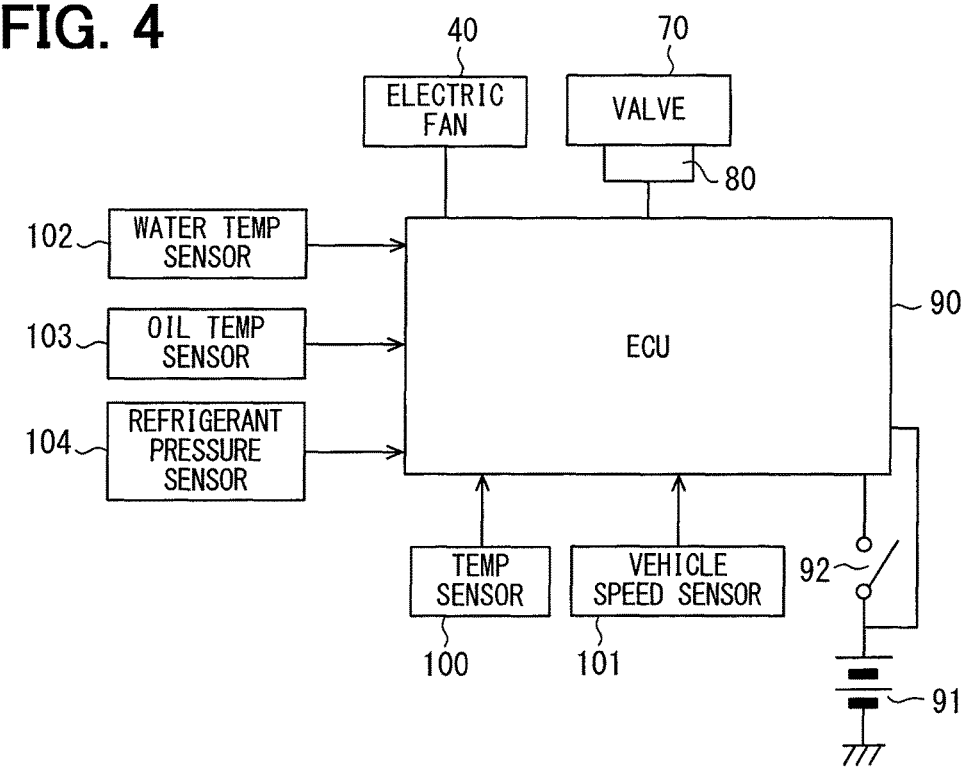
FIG. 4 illustrates an electrical configuration of the cooling module in FIG.

With reference to FIG. 4, next, a description will be given of an electrical configuration of the cooling module 10 according to the present embodiment.

The cooling module 10 includes an electronic control unit 90. The electronic control unit 90 is configured of a microcomputer, a memory, and the like. The electronic control unit 90 is a well-known electronic control unit that receives electric power from a vehicle-mounted battery 91 for its operation.

The electronic control unit 90 executes cooling control processing and fan control processing in accordance with a computer program stored in the memory.

In executing the cooling control processing, the electronic control unit 90 controls the valve 70 through the electric motor 80 based on a switch signal of an ignition switch 92, a value detected by a temperature sensor 100, a value detected by a vehicle speed sensor 101, a value detected by a water temperature sensor 102, and a value detected by an oil temperature sensor 103. In executing the fan control processing, the electronic control unit 90 controls the electric fan 40 based on a switch signal of the ignition switch 92 and a value detected by a refrigerant pressure sensor 104. The temperature sensor 100 corresponds to a first temperature sensor. The water temperature sensor 102 and the oil temperature sensor 103 correspond to a second temperature sensor.

The temperature sensor 100 detects, for example, a surface temperature of the exhaust manifold 5 as a temperature of the exhaust manifold 5. The vehicle speed sensor 101 detects a speed of the automobile as a rotational speed of driving wheels of the automobile. The water temperature sensor 102 detects a temperature of engine cooling water for cooling the drive engine 3. The oil temperature sensor 103 detects a temperature of engine oil. The engine oil is used for lubricating components of the drive engine 3 and cooling the drive engine 3.

The ignition switch 92 is a power switch that turns on and off (i.e., activates and deactivates) the drive engine 3. The refrigerant pressure sensor 104 detects a refrigerant pressure between the condenser 20 on a refrigerant inlet side and the compressor on a refrigerant outlet side. That is, the refrigerant pressure sensor 104 detects a refrigerant pressure of the condenser 20 on the refrigerant inlet side. The electric fan 40 is configured of, for example, an axial fan, an electric motor for driving the axial fan, and the shroud 50.

Figure 5:
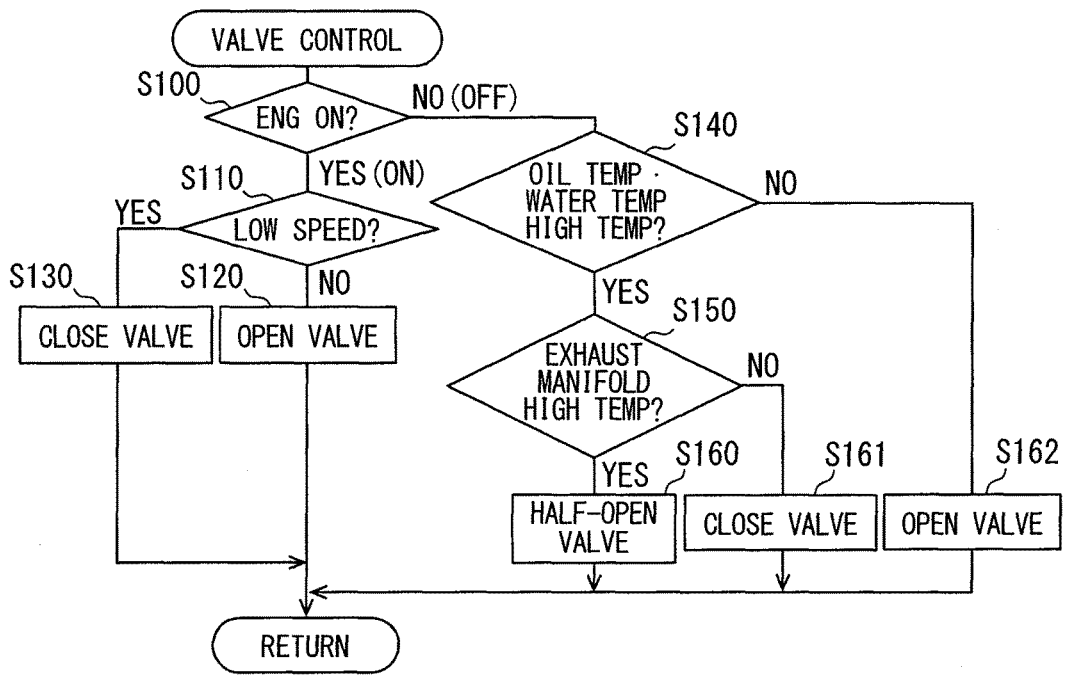
FIG. 5 is a flowchart illustrating cooling control processing to be executed by an electronic control unit in FIG. 4.
Figure 6:
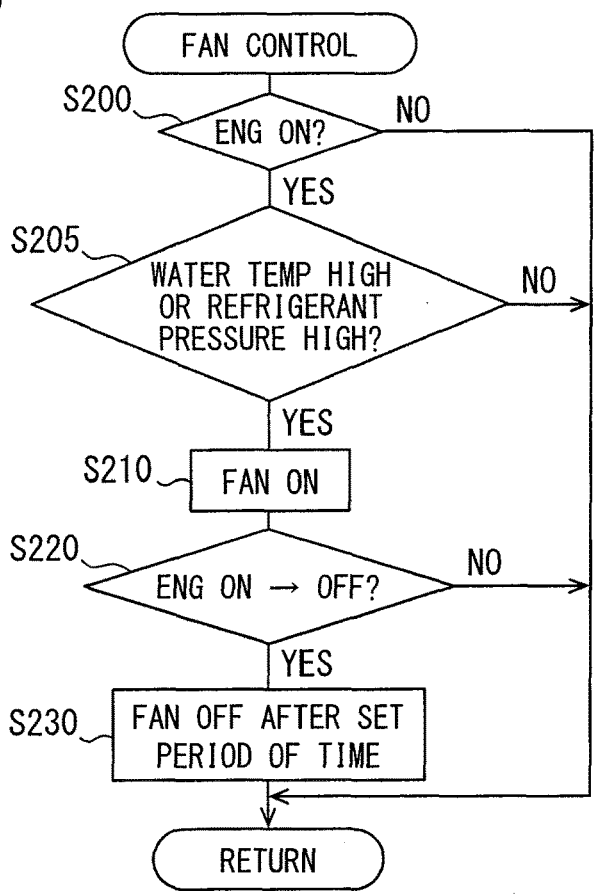
FIG. 6 is a flowchart illustrating fan control processing to be executed by the electronic control unit in FIG. 4.
Figure 7:
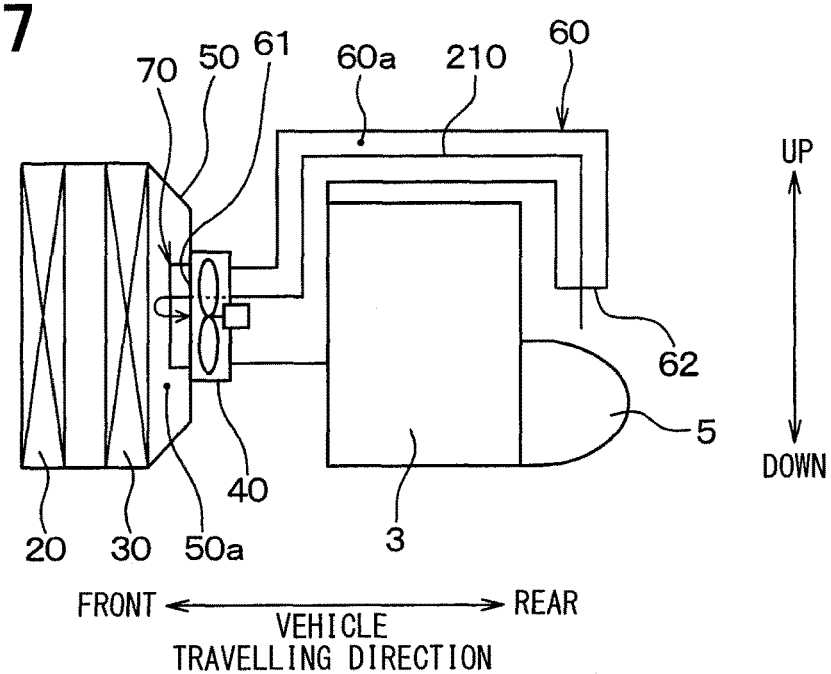
FIG. 7 is a side view illustrating the duct, the valve, the electric fan, the introduction passage, the drive engine, and the exhaust manifold in FIG. 1, and illustrates air flow from the exhaust manifold to the introduction passage.

With reference to FIGS. 5 to 7, next, a description will be given of control processing to be executed by the electronic control unit 90.

FIG. 5 is a flowchart of the cooling control processing. FIG. 6 is a flowchart of the fan control processing. The electronic control unit 90 executes the cooling control processing and the fan control processing in parallel. A description will be given of the cooling control processing prior to a description of the fan control processing. The electronic control unit 90 executes a computer program corresponding to the cooling control processing, in accordance with the flowchart of FIG. 5.

First, in S100, it is determined whether the drive engine 3 ("ENG" in FIG. 5) is operating, based on an output signal of the ignition switch 92. Specifically, it is determined whether the ignition switch 92 is turned on. When the ignition switch 92 is turned on, it is determined that the drive engine 3 is operating (ON), that is, the determination in S100 is made as YES.

Next, in S110, it is determined whether a speed of the automobile is less than a predetermined speed, based on a value detected by the vehicle speed sensor 101. When the speed of the automobile is equal to or more than the predetermined speed (threshold), it is determined that the speed of the automobile is high, that is, the determination in S110 is made as NO.

In the present embodiment, the predetermined speed is, for example, 40 km/h. Thus, when the speed of the automobile is equal to or more than 40 km/h, the determination in S110 is made as YES. In this case, in S120, the electric motor 80 is controlled to open the valve 70. The valve 70 is thus driven by the electric motor 80 to open the air passage 60a. The processing then returns to S100.

On the other hand, when the speed of the automobile is equal to or more than 0 km/h and is less than 40 km/h, it is determined that the speed of the automobile is less than the predetermined speed (i.e., low speed), based on the value detected by the vehicle speed sensor 101, that is, the determination in S110 is made as YES.

In this case, in S130, the electric motor 80 is controlled to close the valve 70. The valve 70 is thus driven by the electric motor 80 to close the air passage 60a. The processing then returns to S100.

Further, in S100, when the ignition switch 92 is turned off, it is determined that the drive engine 3 is deactivated (OFF), that is, the determination is made as NO. Next, in S140, it is determined whether the drive engine 3 is to be cooled. Specifically, the following determinations (1) (2) are made based on the value detected by the water temperature sensor 102 and the value detected by the oil temperature sensor 103. (1) It is determined whether the engine cooling water is equal to or more than a predetermined temperature, based on the value detected by the water temperature sensor 102. (2) It is determined whether the engine oil is equal to or more than a predetermined temperature, based on the value detected by the oil temperature sensor 103.

For example, when the engine cooling water is equal to or more than the predetermined temperature or when the engine oil is equal to or more than the predetermined temperature, it is determined in S140 that the temperature of the drive engine 3 is high and the drive engine 3 is to be cooled, that is, the determination is made as YES.

Next, in S150, it is determined whether a temperature of the exhaust manifold 5 is equal to or more than a predetermined temperature P1, based on the value detected by the temperature sensor 100. When the temperature of the exhaust manifold 5 is equal to or more than a predetermined temperature P1, it is determined that the temperature of the exhaust manifold 5 is high, that is, the determination in S150 is made as YES.

In this connection, in S160, the electric motor 80 is controlled to set the valve 70 to a half-opened state. Specifically, the electric motor 80 is controlled to set the degree of opening of the valve 70 to 50%. The processing then returns to S100.

The degree of opening of the valve 70 is a ratio indicating an opening degree of the air passage 60a in the duct 60. When the valve 70 closes the air passage 60a of the duct 60, the degree of opening is defined as 0%. When the valve 70 fully opens the air passage 60a, the degree of opening is defined as 100%. In the present embodiment, the state where the valve 70 opens the air passage 60a in S162 is defined as the full-opened state (i.e., the degree of opening of 100%).

In S150, when it is determined that the temperature of the exhaust manifold 5 is less than the predetermined temperature P1, based on the value detected by the temperature sensor 100, the determination in S150 is made as NO. That is, when the temperature of the exhaust manifold 5 is low, the determination in S150 is made as NO. In this connection, in S161, the electric motor 80 is controlled to close the valve 70. The valve 70 thus closes the air passage 60a of the duct 60. That is, the degree of opening of the valve 70 is set to 0%. The processing then returns to S100.

Further, in S140, when the temperature of the engine cooling water is less than the predetermined temperature or/and when the temperature of the engine oil is less than the predetermined temperature, it is determined that the drive engine 3 is not to be cooled, that is, the determination is made as NO.

As described above, when it is determined that the drive engine 3 is not to be cooled, that is, when the determination in S140 is made as NO, the electric motor 80 is controlled to open the valve 70 in S162. The valve 70 thus opens the air passage 60a of the duct 60. That is, the degree of opening of the valve 70 is set to 100%. The processing then returns to S100.

The processing steps in S100 to S162 are repeated to open or close the valve 70.

The electronic control unit 90 executes a computer program corresponding to the fan control processing, in accordance with the flowchart of FIG. 6.

First, in S200, it is determined whether the drive engine 3 ("ENG" in FIG. 6) is operating, based on an output signal of the ignition switch 92. When the ignition switch 92 is turned on, it is determined that the drive engine 3 is operating (ON), that is, the determination in S200 is made as YES.

Next, in S205, Determination (1) and Determination (2) are made. As to Determination (1), it is determined whether a temperature of engine cooling water flowing to the radiator 30 is equal to or more than a predetermined temperature, based on a value detected by the water temperature sensor 102. As to Determination (2), it is determined whether a refrigerant pressure of the condenser 20 on the side of the refrigerant inlet is equal to or more than a predetermined value, based on a value detected by the refrigerant pressure sensor 104.

When the temperature of the engine cooling water is equal to or more than the predetermined temperature or/and when the refrigerant pressure of the condenser 20 on the side of the refrigerant inlet is equal to or more than the predetermined value, the determination in S205 is made as YES. With this connection, in S210, the electric fan 40 is activated. As a result, the electric fan 40 sucks air flow from the front of the automobile in the vehicle longitudinal direction through the front grille opening 2, the condenser 20, and the radiator 30, and blows the sucked air flow to the drive engine 3. The air flow introduced from the front of the automobile in the vehicle longitudinal direction through the front grille opening 2 is thus guided by the shroud 50, and then passes through the condenser 20, the radiator 30, and the electric fan 40. Therefore, the air flow passing from the introduction passage 50a to the drive engine 3 through the electric fan 40 cools the drive engine 3.

Next, in S220, it is determined whether state transition occurs from the state where the drive engine 3 is activated to the state where the drive engine 3 is deactivated, based on an output signal of the ignition switch 92. Specifically, it is determined whether state transition occurs at the ignition switch 92 from the ON state to the OFF state.

When the ignition switch 92 changes from the ON state to the OFF state, the determination in S220 is made as YES. In S230, the electric fan 40 is stopped after a lapse of a certain period. That is, when the drive engine 3 is deactivated, the electric fan 40 continues to operate for a certain period, and then is stopped. The processing then returns to S200.

In S200, when the ignition switch 92 is turned off, it is determined that the drive engine 3 is deactivated, that is the determination is made as NO. The processing then returns to S200.

Further, in S220, when the ignition switch 92 remains ON and the drive engine 3 remains activation, the determination is made as NO. In this case, the electric fan 40 continues to operate, and the processing returns to S200.

The processing steps in S200 to S230 are repeated to start the operation of the electric fan 40, using a combination of the operating state of the drive engine 3 with other conditions. When the drive engine 3 is deactivated, the electric fan 40 continues to operate for a certain period, and then is stopped.

When the temperature of the engine cooling water is less than the predetermined temperature and when the refrigerant pressure of the condenser 20 on the side of the refrigerant inlet is less than the predetermined value, the determination in S205 is made as NO.

Next, a description will be given of the specific operation of the cooling module 10 according to the present embodiment.

First, when it is determined in S110 that the speed of the automobile is low, that is, when the determination in S110 is made as YES, the electric motor 80 is controlled to close the valve 70 (S130).

When the valve 70 opens the air passage 60a at the low speed of the automobile, the electric fan 40 is activated to generate air flow passing from the exhaust manifold 5 to the electric fan 40 through the duct 60. This decreases the quantity of air passing through the front grille opening 2, the condenser 20, and the radiator 30.

In response, in S130, the electric motor 80 is controlled to close the valve 70. Thus, the valve 70 is driven by the electric motor 80 to close the air passage 60a. Accordingly, even when the electric fan 40 is activated, no air flow passing from the exhaust manifold 5 to the electric fan 40 through the duct 60 is generated. This increases the quantity of air passing from the front grille opening 2 to the drive engine 3 via the condenser 20, the radiator 30, and the electric fan 40. Consequently, the air flow cools the condenser 20, the radiator 30, and the drive engine 3.

When it is determined in S110 that speed of the automobile is high, that is, when the determination in S110 is made as NO, the electric motor 80 is controlled to open the valve 70 (S120).

During the high-speed travelling of the automobile, air flow is generated with the travelling of the automobile, the air flow passing from the front side of vehicle in the vehicle longitudinal direction through the front grille opening 2, the condenser 20, the radiator 30, and the electric fan 40.

As described above, as shown with an arrow 200 in FIG. 3, a portion of the air flow that is vehicle travelling wind passing from the front side of the automobile in the vehicle longitudinal direction through the front grille opening 2, the condenser 20, and the radiator 30 is introduced into the duct 60 through the front opening 61, and is blown toward the exhaust manifold 5 through the rear opening 62. The air flow blown from the rear opening 62 of the duct 60 can cool the exhaust manifold 5, the catalyzer, and the turbocharger turbine.

As described above, the air flow, that has cooled the exhaust manifold 5, the catalyzer, and the turbocharger turbine, flows to the bottom of the exhaust manifold 5. Thus, air flow is generated to pass around the front grille opening 2, the condenser 20, the radiator 30, the duct 60, and the exhaust manifold 5 and then to the bottom of the automobile.

Of the air flows introduced from the front side of the automobile in the vehicle longitudinal direction into the introduction passage 50a through the front grille opening 2, air flow that does not enter into the duct 60 is sucked to the electric fan 40. The air sucked by the electric fan 40 passes around the drive engine 3, and flows toward the bottom of the floor. Thus, the air flow passing from the introduction passage 50a to the drive engine 3 through the electric fan 40 cools the drive engine 3.

Further, in the state where the drive engine 3 stops, it is determined in S140 that the drive engine 3 is to be cooled, that is, the determination in S140 is made as YES, and it is determined in S150 that the temperature of the exhaust manifold 5 is high, that is, the determination in S150 is made as YES. In this case, the electric motor 80 is controlled to put the valve 70 into the semi-opened state (S160). Thus, with the activation of the electric fan 40, as shown with an arrow 210 in FIG. 7, the air flow sucked from the exhaust manifold 5 is blown to the introduction passage 50a through the duct 60. Then, the blown air is sucked to the electric fan 40. This can move the air flow heated by the exhaust manifold 5, the catalyzer, and the turbocharger turbine, to the electric fan 40 through the duct 60.

The air flow can cool the exhaust manifold 5, the catalyzer, and the turbocharger turbine. In addition, air flow is generated to pass from the front side of the automobile in the vehicle-travelling direction through the front grille opening 2, the condenser 20, the radiator 30, and the electric fan 40. Therefore, the air flow can cool the radiator 30. As described above, the exhaust manifold 5 and the like can be cooled while ensuring the quantity of air passing through the radiator 30.

In the state where the drive engine 3 stops, it is determined in S140 that the drive engine 3 is to be cooled, that is, the determination in S140 is made as YES, and it is determined in S150 that the temperature of the exhaust manifold 5 is low, that is, the determination in S150 is made as NO. In this case, the electric motor 80 is controlled to close the valve 70 (S161). Accordingly, irrespective of the activation of the electric fan 40, no air flow is generated to pass from the exhaust manifold 5 to the electric fan 40 through the duct 60. This can ensure the quantity of air passing from the front grille opening 2 through the radiator 30.

Further, in the state where the drive engine 3 stops, when it is determined in S140 that the drive engine 3 is to be cooled, that is, when the determination in S140 is made as NO, the electric motor 80 is controlled to open the valve 70 (S162). In this case, although the quantity of air passing from the front grille opening 2 through the radiator 30 decreases, with the activation of the electric fan 40, the quantity of air flow passing from the exhaust manifold 5 to the electric fan 40 through the duct 60 increases. This can cool the exhaust manifold 5 and the like.

In the present embodiment described above, the exhaust manifold 5 is arranged rear of the drive engine 3 in the travelling direction in the front engine room 1 of the automobile. The duct 60 has the front opening 61 opened forward of the drive engine 3 in the vehicle-travelling direction, and the rear opening 62 formed on the side closer to the exhaust manifold 5 relative to the drive engine 3, and allows the air flow to pass through the air passage 60a. The valve 70 opens and closes the air passage 60a of the duct 60. When it is determined in S130 that the speed of the automobile is high, based on the value detected by the vehicle speed sensor 101 for detecting the speed of the automobile, the electronic control unit 90 causes the valve 70 to open the air passage 60a. In the state where the automobile is travelling at high speed, with the travelling of the automobile, the duct 60 takes the air flow, which is introduced into the front engine room 1 through the front grille opening 2, from the front opening 61, and guides the air flow to the exhaust manifold 5 through the rear opening 62. This can provide the cooling module 10 for cooling the drive engine 3, the exhaust manifold 5, the catalyzer, and the turbocharger turbine. Therefore, thermal damage can be prevented from occurring in the exhaust manifold 5, the catalyzer, the turbocharger turbine, and their peripheral components.

In the present embodiment, in the state where the drive engine 3 stops, when the temperature of the exhaust manifold is high, the electronic control unit 90 causes the valve 70 to open the air passage 60a. Thus, at so-called dead soak, with the activation of the electric fan 40, air flow is generated to pass from the exhaust manifold 5 to the electric fan 40 through the duct 60. Accordingly, hot air heated by the exhaust manifold 5 can be transferred from the exhaust manifold 5 to the introduction passage 50a. Therefore, the air flow can cool the exhaust manifold 5, the catalyzer, and the turbocharger turbine.

Especially when it is determined that the drive engine 3 is to be cooled and the temperature of the exhaust manifold 5 is equal to or more than a predetermined temperature, the valve 70 is set to the semi-opened state (S160). As compared to the case where it is determined that the drive engine 3 is not to be cooled, the degree of opening of the valve 70 is made smaller. Accordingly, as compared to the case where it is determined that the drive engine 3 is not to be cooled, the quantity of air flow passing from the front grille opening 2 through the radiator 30 and the electric fan 40 can be increased. Therefore, the radiator 30 and the drive engine 3 can be appropriately cooled.

In the present embodiment, the air flow that has cooled the exhaust manifold 5, the catalyzer, and the turbocharger turbine flows to a space below the floor of the exhaust manifold 5. Accordingly, the resistance of the air flow flowing into the front engine room 1 can be reduced.

In the present embodiment, the front opening 61 of the duct 60 is formed in the shroud 50. Thus, in the state where the automobile is travelling at high speed, the resistance of the air flow passing through the front grille opening 2 and the radiator 30 can be reduced. For this reason, it is possible to acquire the same quantity of air passing the radiator 30 as the quantity of air in the case of using a conventional electric fan 40 including a shroud 50 provided with a ram pressure hole. Therefore, the capability of cooling the radiator 30 can be improved.

When it is determined that the speed of the automobile is low, the electronic control unit 90 controls the valve 70 via the electric motor 80 such that the valve 70 closes the air passage 60a of the duct 60. Thus, no air flow is generated to flow from the exhaust manifold 5 to the electric fan 40 through the duct 60. In the present embodiment, it is possible to acquire the same quantity of air passing through the radiator 30 as the quantity of air in the case of using a conventional electric fan 40 including a shroud 50 provided with a ram pressure hole and a flap for closing the ram pressure hole. Further, in the present embodiment, it is possible to acquire a larger quantity of air than the quantity of air in the case of using a conventional electric fan 40 including a shroud 50 provided with a ram pressure hole.

Second Embodiment

In the first embodiment, when the speed of the automobile is low, the valve 70 is closed. In a second embodiment, alternatively, when the speed of the automobile is low, the degree of opening of the valve 70 is controlled in accordance with the temperature of the exhaust manifold 5.

The present embodiment is different from the first embodiment in the cooling control processing of the electronic control unit 90. The cooling control processing in the present embodiment will be described below with reference to FIGS. 8 and 9.

Figure 8:
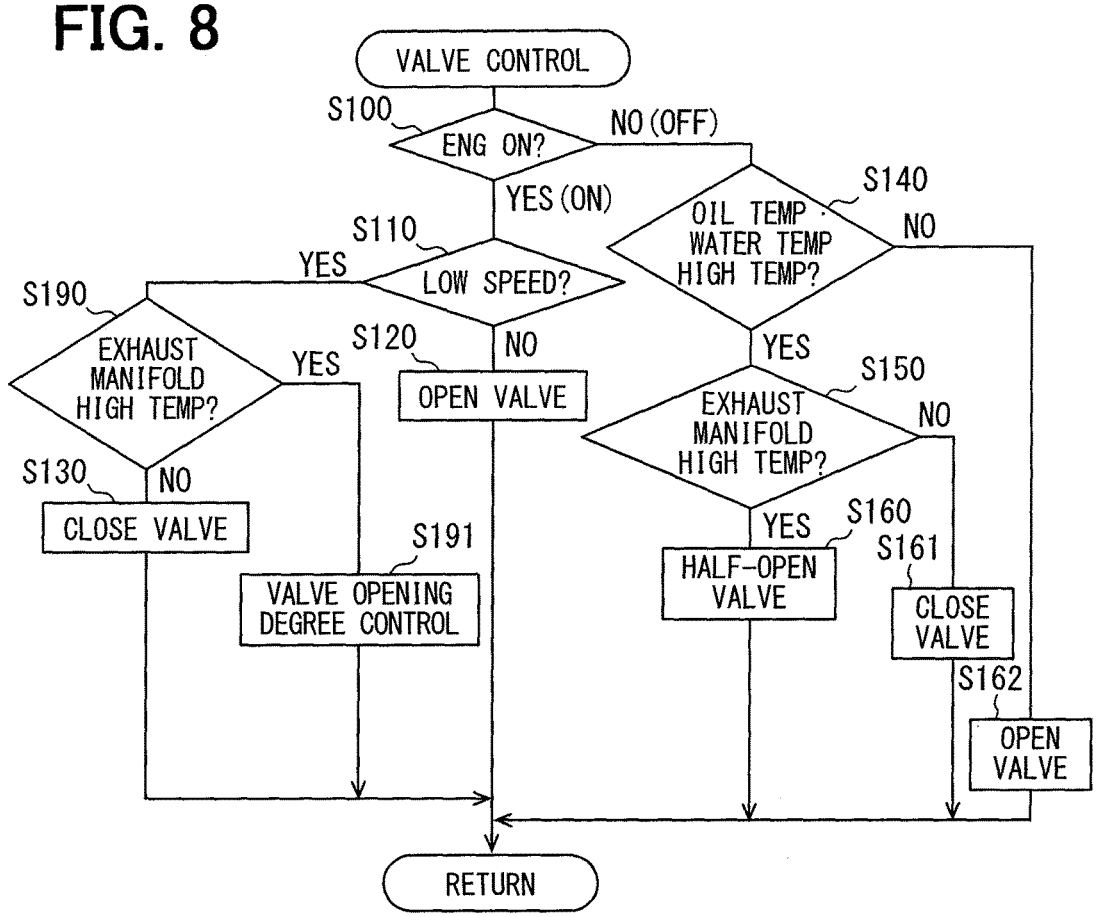
FIG. 8 is a flowchart illustrating cooling control processing to be executed by an electronic control unit according to a second embodiment.

FIG. 8 is a flowchart of the cooling control processing according to the present embodiment. The flowchart of FIG. 8 is acquired by adding S190, S191 to the flowchart of FIG. 5. The same steps in FIG. 8 as those in FIG. 5 are given the same reference signs, and the description thereof will not be given here. The electronic control unit 90 executes the cooling control processing in accordance with the flowchart of FIG. 8 instead of FIG. 5.

In S100, when it is determined that the speed of the automobile is less than a predetermined speed, based on a value detected by the vehicle speed sensor 101, it is determined that the speed of the automobile is low, that is the determination is made as YES.

In this case, in S190, it is determined whether the temperature of the exhaust manifold 5 is equal to or more than the predetermined temperature P1, based on the value detected by the temperature sensor 100.

When the temperature of the exhaust manifold 5 is less than the predetermined temperature P1, the determination in S190 is made as NO. In this case, in S130, the electric motor 80 is controlled to close the valve 70. Thus, the valve 70 is driven by the electric motor 80 to close the air passage 60a. Accordingly, even when the electric fan 40 is activated, no air flow is generated to flow from the exhaust manifold 5 to the electric fan 40 through the duct 60.

When the temperature of the exhaust manifold 5 is equal to or more than the predetermined temperature P1, the determination in S190 is made as YES. In this case, in S191, the electric motor 80 is controlled to control the degree of opening of the valve 70 based on the temperature detected by the temperature sensor 100.

Figure 9:
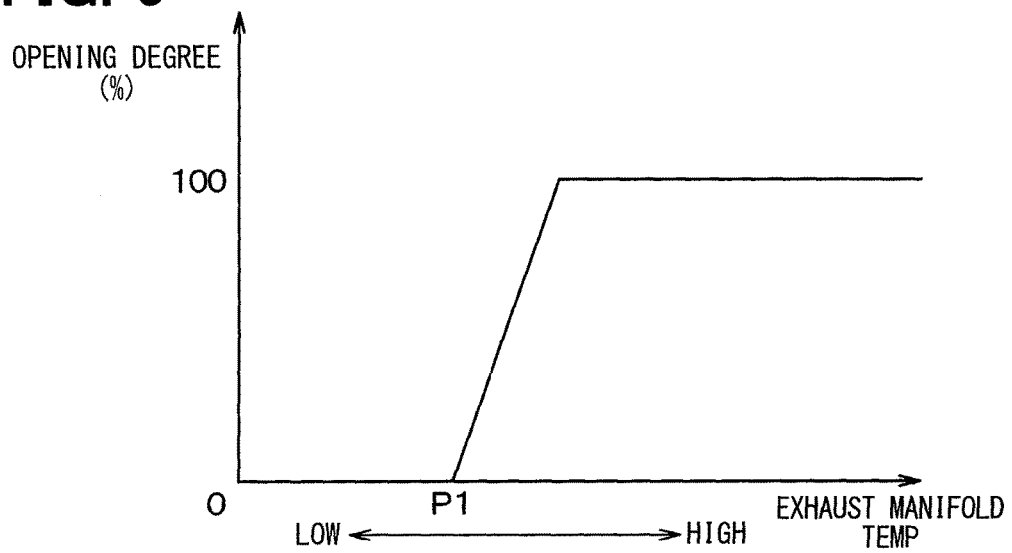
FIG. 9 is a characteristic view illustrating a relationship between an opening degree of the valve and a temperature of an exhaust manifold, for use in the cooling control processing in FIG. 8.

Specifically, as the temperature of the exhaust manifold 5 becomes higher, the degree of opening of the valve 70 gradually increases (see FIG. 9).

Graph in FIG. 9 shows the following example. That is, when the temperature of the exhaust manifold 5 is equal to or more than the predetermined temperature P1, as the temperature of the exhaust manifold 5 becomes higher, the degree of opening gradually increases from 0% to 100%. The degree of opening refers to how the air passage 60a opens. For this reason, as the temperature of the exhaust manifold 5 becomes higher, air flowing from the exhaust manifold 5 to the electric fan 40 through the duct 60 increases. In this connection, the quantity of air passing the front grille opening 2, the radiator 30, and the electric fan 40 decreases.

In the present embodiment described above, when it is determined that the speed of the automobile is low and the temperature of the exhaust manifold 5 is equal to or more than the predetermined temperature P1, the electronic control unit 90 controls the valve 70 such that the degree of opening of the valve 70 gradually increases as the temperature of the exhaust manifold 5 becomes higher. For this reason, as the temperature of the exhaust manifold 5 becomes higher, air flow flowing from the exhaust manifold 5 to the electric fan 40 through the duct 60 increases. Accordingly, the quantity of air passing through the radiator 30 can be optimized while cooling the exhaust manifold 5.

Third Embodiment

In a third embodiment, holes 60c, 60d are formed in the duct 60 of the cooling module 10 of the first embodiment to cool components to be cooled other than the exhaust manifold 5.

Figure 10:
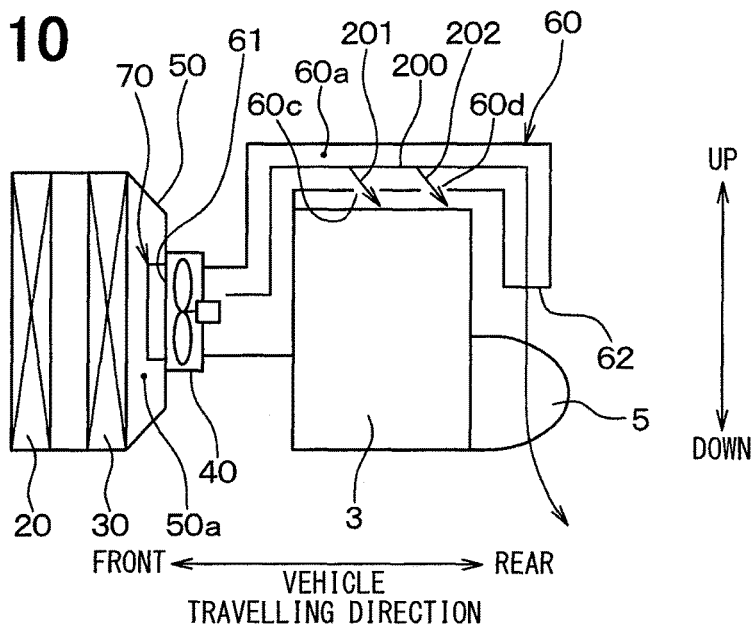
FIG. 10 is a side view illustrating a structure of a duct according to a third embodiment.

FIG. 10 is a side view of the cooling module 10 according to the present embodiment. The cooling module 10 according to the present embodiment is acquired by forming the holes 60c, 60d in the duct 60 of the cooling module 10 of the first embodiment. Thus, the holes 60c, 60d in the duct 60 will be described below, and the description of the other configurations will not be given here. The same components in FIG. 10 as those in FIG. 3 are given the same reference signs.

The holes 60c, 60d are opened from the air passage 60a to the outside of the duct 60 between the openings 61, 62 of the duct 60. The holes 60c, 60d are located above the components to be cooled (not illustrated) in the vertical direction. Examples of the components to be cooled include an alternator and a waste gate valve. The hole 60*d* is arranged closer to the rear opening 62 relative to the hole 60*c*.

In the present embodiment thus configured, in the state where the automobile is travelling at high speed, as shown with an arrow 200 in FIG. 10, a portion of air flow that is vehicle travelling wind passing from the front side of the automobile in the vehicle longitudinal direction through the front grille opening 2, the condenser 20, and the radiator 30 is introduced into the air passage 60*a* of the duct 60 through the front opening 61, and then is blown from the rear opening 62 to the exhaust manifold 5.

At this time, air flow is blown from the air passage 60*a* to the outside of the duct 60 through the holes 60*c*, 60*d* as shown with arrows 201, 202. The air flow can thus be blown to the components to be cooled, through the holes 60*c*, 60*d*. This can spot-cool each of the components to be cooled.

In the present embodiment described above, the holes 60*c*, 60*d* communicating the inside of the air passage 60*a* with the outside of the duct 60 are formed between the openings 61, 62 of the duct 60. Accordingly, various components to be cooled, other than the exhaust manifold 5, can be spot-cooled by blowing air flow from the holes 60*c*, 60*d* to the components to be cooled.

Fourth Embodiment

In a fourth embodiment, an air blowing structure 110 that blows air flow to the region between the openings 61, 62 of the duct 60 is provided in the cooling module 10 of the first embodiment, to increase air flow flowing from the front opening 61 to the rear opening 62 of the duct 60. The present embodiment will be described below with reference to FIGS. 11 to 15.

Figure 11:
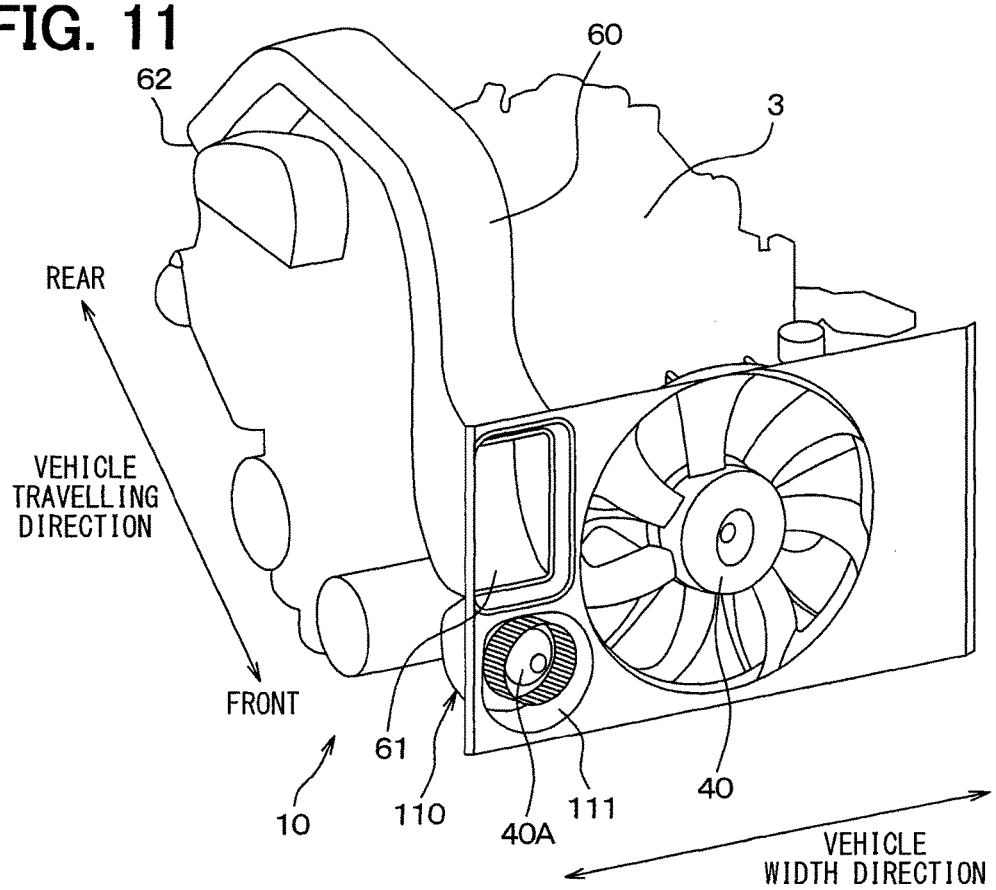
FIG. 11 is a perspective view illustrating a cooling module according to a fourth embodiment as viewed from a radiator side.
Figure 12:
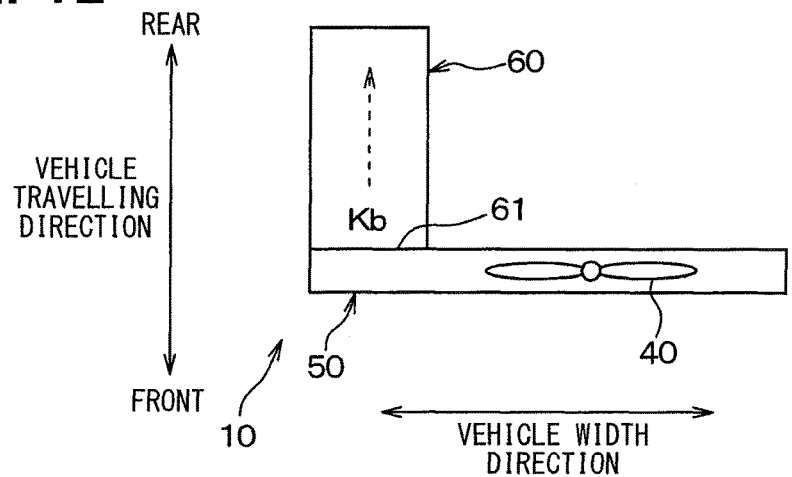
FIG. 12 is a view illustrating the cooling module according to the fourth embodiment as viewed from above in a vertical direction.
Figure 13:
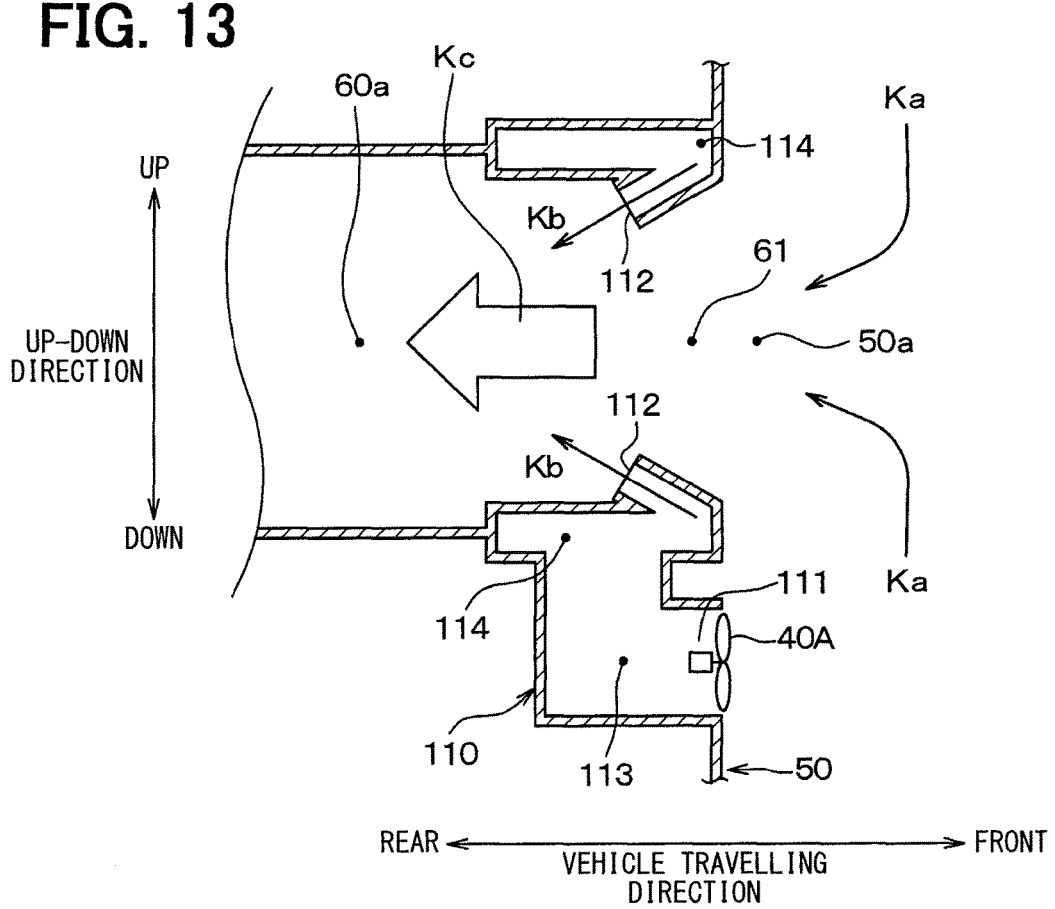
FIG. 13 is a sectional view illustrating an internal configuration of an air blowing structure according to the fourth embodiment.

FIG. 11 is a perspective view illustrating the internal configuration of the cooling module 10 according to the present embodiment as viewed from the front of the vehicle. FIG. 12 is a perspective view illustrating the cooling module 10 from above in the vertical direction. FIG. 13 is a sectional view illustrating the inside of the air blowing structure 110 of the cooling module 10.

The cooling module 10 according to the present embodiment is acquired by adding the air blowing structure 110 to the cooling module 10 of the first embodiment, and omitting the valve 70. The air blowing structure 110 will be described below, and the description of components other than the air blowing structure 110 will not be given here.

The air blowing structure 110 is provided near the front opening 61 of the duct 60. The air blowing structure 110 is configured of an air inlet 111 (inlet port), an air outlet 112, and air passages 113, 114.

The air inlet 111 is arranged below the front opening 61 in the shroud 50 in the vertical direction. The air inlet 111 is defined rear of the shroud 50 relative to the radiator 30 in the vehicle-travelling direction so as to be directed toward the radiator 30 (that is, the front side in the vehicle-travelling direction).

The air outlet 112 has a ring shape to surround the front opening 61 of the duct 60, and is opened toward the rear opening 62 of the duct 60. The air outlet 112 blows air flow sucked from the air inlet 111 toward the rear opening 62 of the duct 60.

The air passage 113 is formed to guide air flow sucked from the air inlet 111, to the air outlet 112. The air passage 113 is formed below the duct 60 in the vertical direction.

The air passage 114 has a ring shape to surround the air passage 60*a*. The air passage 114 guides air flowing through the air passage 113, to the air outlet 112. An electric fan 40A is arranged in the air passage 113. The electric fan 40A is configured of an axial fan and an electric motor for driving the axial fan.

Figure 14:
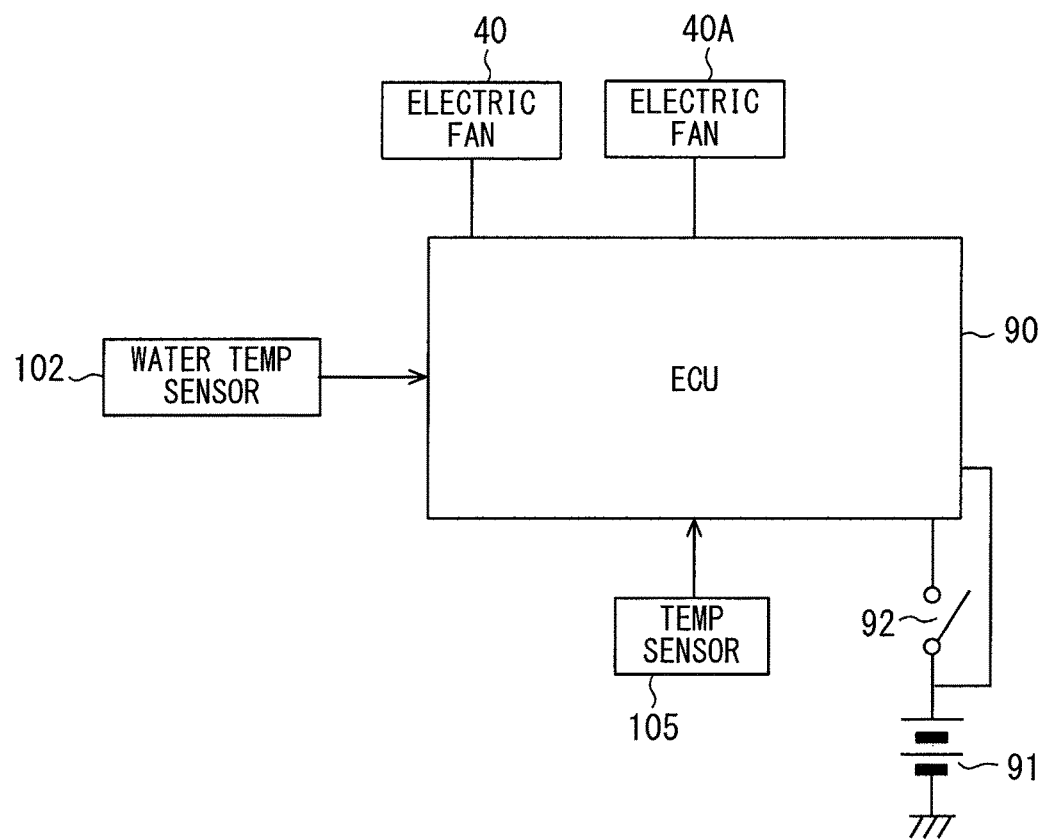
FIG. 14 illustrates an electrical configuration of the cooling module according to the fourth embodiment.

With reference to FIG. 14, next, a description will be given of an electrical configuration of the cooling module 10 according to the present embodiment.

The electronic control unit 90 according to the present embodiment executes fan control processing in accordance with a computer program stored in the memory. In executing the fan control processing, the electronic control unit 90 controls each of the electric fans 40, 40A based on a switch signal of the ignition switch 92, a value detected by a temperature sensor 105, and the like. The temperature sensor 105 detects a temperature of air in the front engine room 1 as a temperature in the front engine room 1. More specifically, the temperature sensor 105 may detect a temperature of air rear of the drive engine 3 in the vehicle-travelling direction in the front engine room 1. Alternatively, the temperature sensor 105 may detect a temperature of air in the duct 60 (specifically, a temperature of air near the rear opening 62), and may use the detected temperature as a temperature of air rear of the drive engine 3 in the vehicle-travelling direction. That is, in place of the temperature of air rear of the drive engine 3 in the vehicle-travelling direction, the temperature of air in the duct 60 may be detected. The temperature sensor 105 corresponds to a third temperature sensor.

Figure 15:
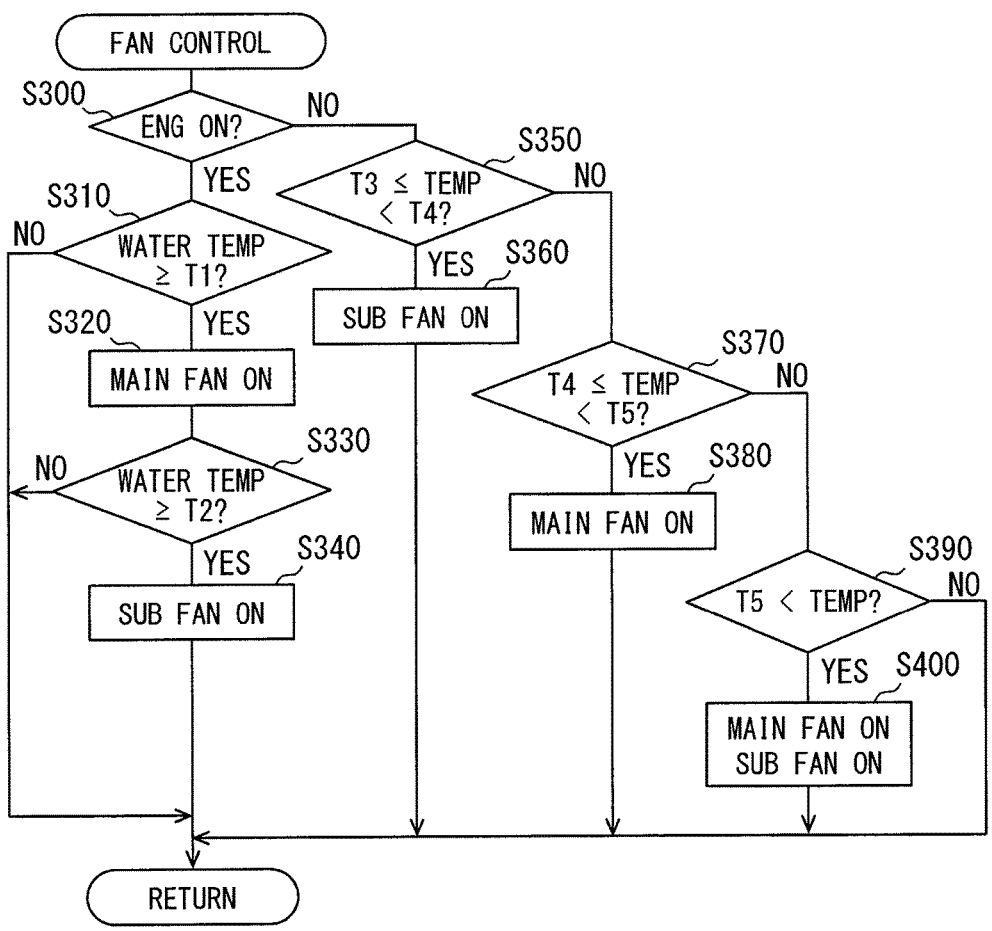
FIG. 15 is a flowchart illustrating cooling control processing to be executed by an electronic control unit in FIG. 14.

With reference to FIG. 15, next, a description will be given of control processing to be executed by the electronic control unit 90.

FIG. 15 is a flowchart of fan control processing. The electronic control unit 90 executes the fan control processing in accordance with the flowchart of FIG. 15.

First, in S300, it is determined whether the drive engine 3 ("ENG" in FIG. 15) is operating, based on an output signal of the ignition switch 92.

When the ignition switch 92 is turned on, it is determined that the drive engine 3 is operating (ON), that is, the determination in S300 is made as YES.

Next, in S310, it is determined whether a temperature of engine cooling water flowing to the radiator 30 is equal to or more than a water temperature T1, based on a value detected by the water temperature sensor 102.

When the temperature of the engine cooling water is equal to or more than the water temperature T1, the determination in S310 is made as YES, and then the electric fan ("main fan" in FIG. 15) 40 is activated (S320). The water temperature T1 corresponds to a first temperature.

Next, in S330, it is determined whether a temperature of engine cooling water flowing to the radiator 30 is equal to or more than a water temperature T2 (>T1), based on a value detected by the water temperature sensor 102. The water temperature T2 corresponds to a second temperature.

When the temperature of the engine cooling water is equal to or more than the water temperature T2, the determination in S330 is made as YES, and then the electric fan 40A ("sub fan" in FIG. 15) is activated (S340).

On the contrary, when the temperature of the engine cooling water is less than the water temperature T1, the determination in S320 is made as NO and the processing returns to S300. Therefore, each of the electric fans 40, 40A is stopped.

As described above, when it is determined that the temperature of the engine cooling water is less than the water temperature T1, the electric fans 40, 40A are stopped. When it is determined that the temperature of the engine cooling water is equal to or more than the water temperature T1 and is less than the water temperature T2, the electric fan 40 is activated, of the electric fans 40, 40A. When it is determined that the temperature of the engine cooling water is equal to or more than the water temperature T2, each of the electric fans 40, 40A is activated.

When it is determined in S300 that the drive engine 3 stops, based on the output signal of the ignition switch 92, that is, when the determination in S300 is made as NO, the following determinations are made in S350, S370, and S390.

In S350, it is determined whether the temperature of air in the front engine room 1 is equal to or more than an air temperature T3 and is less than an air temperature T4, based on the value detected by the temperature sensor 105. The air temperature T3 corresponds to a third temperature, and the air temperature T4 corresponds to a fourth temperature.

In S370, it is determined whether the temperature of air in the front engine room 1 is equal to or more than the air temperature T4 and is less than an air temperature T5, based on the value detected by the temperature sensor 105. The air temperature T5 corresponds to a fifth temperature.

In S390, it is determined whether the temperature of air in the front engine room 1 is equal to or more than the air temperature T5, based on the value detected by the temperature sensor 105.

For example, when the temperature of air in the front engine room 1 is equal to or more than the air temperature T3 and is less than the air temperature T4, the determination in S350 is made as YES, and then the electric fan 40A is activated (S360).

When the temperature of air in the front engine room 1 is equal to or more than the air temperature T4 and is less than the air temperature T5, the determination in S370 is made as YES, and then the electric fan 40 is activated in S380.

When the temperature of air in the front engine room 1 is equal to or more than the air temperature T5, the determination in S390 is made as YES, and then each of the electric fans 40, 40A is activated in S400.

As described above, in the state where the drive engine 3 stops, when the temperature of air in the front engine room 1 becomes high, one of the electric fans 40, 40A is activated.

Next, a description will be given of the specific operation of the cooling module 10 according to the present embodiment.

First, in the state where the automobile is travelling, with the travelling of the automobile, an air flow is generated as vehicle travelling wind passing from the front side of the automobile in the vehicle longitudinal direction, through the front grille opening 2, the condenser 20, the radiator 30, and the electric fan 40.

When the electric fan 40 is activated, with the activation of the electric fan 40, air flow is generated to pass from the front side of the automobile in the vehicle longitudinal direction, through the front grille opening 2, the condenser 20, the radiator 30, the introduction passage 50a, and the electric fan 40.

As described above, a portion of the air flow passing from the front side of the automobile in the vehicle longitudinal direction, through the front grille opening 2, the condenser 20, the radiator 30, and the introduction passage 50a is introduced into the duct 60 through the front opening 61, and is blown toward the exhaust manifold 5 through the rear opening 62.

Therefore, the air flow blown from the rear opening 62 of the duct 60 can cool the exhaust manifold 5, the catalyzer, and the turbocharger turbine.

Further, when the electric fan 40A is activated, with the activation of the electric fan 40A, air flow is sucked from the introduction passage 50a into the air blowing structure 110 through the air inlet 111. The sucked air flow is blown from the air outlet 112 to the air passage 60a of the duct 60 through the air passages 113, 114 (see an arrow Kb). As a result, the air pressure in the air passage 60a decreases.

This increases the speed of the air flow flowing from the introduction passage 50a to the air passage 60a of the duct 60 through the front opening 61. Thus, as shown with an arrow Ka, air flow is generated to flow in the air passage 60a of the duct 60 while being dragged from surroundings of the front opening 61 (hereinafter, this air flow will be referred to as dragged air flow). Therefore, the dragged air flow and the air flow blown from the air outlet 112 flow toward the rear opening 62. Accordingly, the quantity of the air blown from the rear opening 62 of the duct 60 to the exhaust manifold 5 increases.

In the present embodiment described above, in the cooling module 10, the air blowing structure 110 includes the air outlet 112 that blows air flow toward the air passage 60a of the duct 60. The air flow blown from the air outlet 112 to the region between the openings 61, 62 in the duct 60 (that is, the air passage 60a) decreases the air pressure in the air passage 60a, thereby generating the dragged air flow passing from surroundings of the front opening 61 into the air passage 60a of the duct 60. Therefore, the dragged air flow and the air flow blown from the air outlet 112 flow toward the rear opening 62. Accordingly, the quantity of the air blown from the rear opening 62 of the duct 60 to the rear side relative to the drive engine 3 can be increased. In this manner, the air flowing from the inside of the front engine room 1 to the region under the floor of the front engine room 1 can be increased, thereby improving the ventilation in the front engine room 1. Thus, heat can be reliably discharged from the rear side relative to the drive engine 3 in the vehicle-travelling direction to the outside of the front engine room 1. That is, the exhaust manifold 5, the catalyzer, the turbocharger turbine, and the like can be reliably cooled with the air flow.

Accordingly, even in the case where the vehicle travelling wind flowing into the front engine room 1 cannot be sufficiently ensured, for example, even in the case where the automobile is climbing a slope, the exhaust manifold 5, the catalyzer, the turbocharger turbine, and the like can be reliably cooled with the air flow.

Generally, an insulator is used as a heat insulating member that suppresses an adverse effect of heat applied from the drive engine 3 to the peripheral components. If the drive engine 3 generates much heat to be applied to the peripheral components, a large number of insulators are used.

On the contrary, in the present embodiment, as described above, the region rear of the drive engine 3 can be reliably cooled with air flow. This can decrease the quantity of heat applied from the drive engine 3 to the peripheral components. Accordingly, the number of used insulators can be reduced. This achieves weight reduction and cost saving of the automobile. Further, in the front engine room 1, the degree of freedom in mounting heat-sensitive electronic components can be improved.

In the present embodiment, as described above, the quantity of air blown from the rear opening 62 of the duct 60 toward the rear side relative to the drive engine 3 is increased to increase the air flowing from the inside of the front engine room 1 to the region below the floor of the front engine room 1. This can decrease the temperature of air in the front engine room 1. Accordingly, the temperature of air sucked into the drive engine 3 can be decreased to suppress occurrence of the knocking phenomenon at the drive engine 3.

In the present embodiment, in the state where the drive engine 3 stops, the electric fan 40A is activated to blow air flow from the rear opening 62 of the duct 60 toward the exhaust manifold 5. Therefore, air flow flowing from the inside of the front engine room 1 to the region below the floor of the front engine room 1 can be generated to decrease the temperature of air in the front engine room 1.

Generally, in the state where the automobile stops, idle reduction is not performed when the temperature of air in the front engine room 1 is equal to or more than a predetermined temperature. For this reason, when the temperature of air in the front engine room 1 becomes equal to or more than the predetermined temperature, the drive engine 3 is activated, which may lead to degradation in fuel efficiency.

On the contrary, in the present embodiment, in the state where the automobile stops, as described above, the electric fan 40A can be activated to decrease the temperature of air in the front engine room 1, increasing the period of idle reduction to improve the fuel efficiency.

In recent years, the front engine room 1 is downsized. Therefore, there is no sufficient room for the duct 60 and the size of the duct 60 cannot be further increased. On the contrary, in the present embodiment, as described above, the air blowing structure 110 can increase the quantity of air blown from the rear opening 62 of the duct 60 to the rear side relative to the drive engine 3. Accordingly, the efficiency of cooling the rear side relative to the drive engine 3 can be improved without increasing the size of the duct 60, such that the inside of the front engine room 1 can be efficiently cooled.

Figure 16:
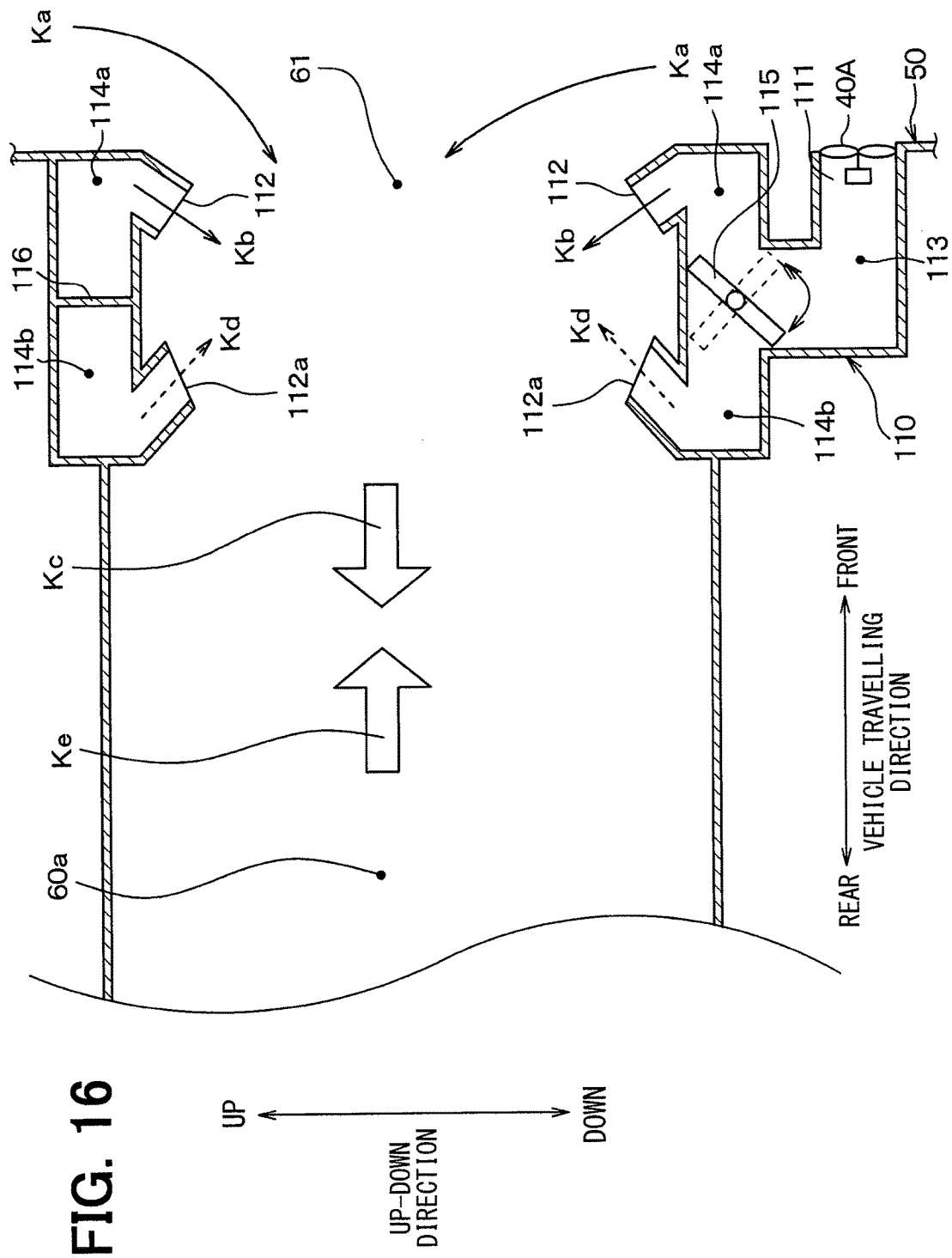
FIG. 16 is a sectional view illustrating an internal configuration of an air blowing structure according to a modification of the fourth embodiment.

In the fourth embodiment, the air outlet 112 is provided to increase air flowing from the front opening 61 to the rear opening 62. In a modification of the fourth embodiment, an air outlet 112a is further provided to increase air flowing from the rear opening 62 to the front opening 61. The present modification will be described below with reference to FIGS. 16 and 17.

The air blowing structure 110 according to the present modification is configured of an air inlet 111, air outlets 112, 112a, air passages 113, 114a, 114b, a switch valve 115, and a partition wall 116.

As in the fourth embodiment, the air inlet 111 is opened to the radiator 30 (that is, the front side in the vehicle-travelling direction) in the rear side of the shroud 50 relative to the radiator 30 in the vehicle-travelling direction.

As in the fourth embodiment, the air outlet 112 has a ring shape to surround the front opening 61 of the duct 60, and is opened toward the rear opening 62 of the duct 60.

The air outlet 112a has a ring shape to surround the front opening 61 of the duct 60, and is opened toward the front opening 61 of the duct 60.

The air passage 113 is formed to guide the air flow sucked from the air inlet 111, to the air outlets 112, 112a.

The air passage 114a has a ring shape to surround the air passage 60a, and guides air flowing in the air passage 113, to the air outlet 112. The air passage 114b has a ring shape to surround the air passage 60a, and guides air flowing in the air passage 113, to the air outlet 112a.

The switch valve 115 is rotatably supported between the air passages 114a, 114b. The switch valve 115 communicates one of the air outlets 112, 112a with the air inlet 111 to close the portion between the other air outlet and the air inlet 111.

The switch valve 115 includes a valve body that communicates one of the air outlets 112, 112a with the air inlet 111 to close the portion between the other air outlet and the air inlet 111, and an electric actuator that drives the valve body. The partition wall 116 separates the air passages 114a, 114b from each other between the air passages 114a, 114b.

The electronic control unit 90 according to the present modification executes switching control processing, in accordance with a computer program stored in a memory. In executing the switching control processing, the electronic control unit 90 controls the switch valve 115 and an electric fan (sub fan) 40A, based on a switch signal of the ignition switch 92, a value detected by the temperature sensor 100, a value detected by the vehicle speed sensor 101, a value detected by the water temperature sensor 102, and a value detected by the oil temperature sensor 103.

Next, a description will be given of the switching control processing to be executed by the electronic control unit 90 according to the present modification.

Figure 17:
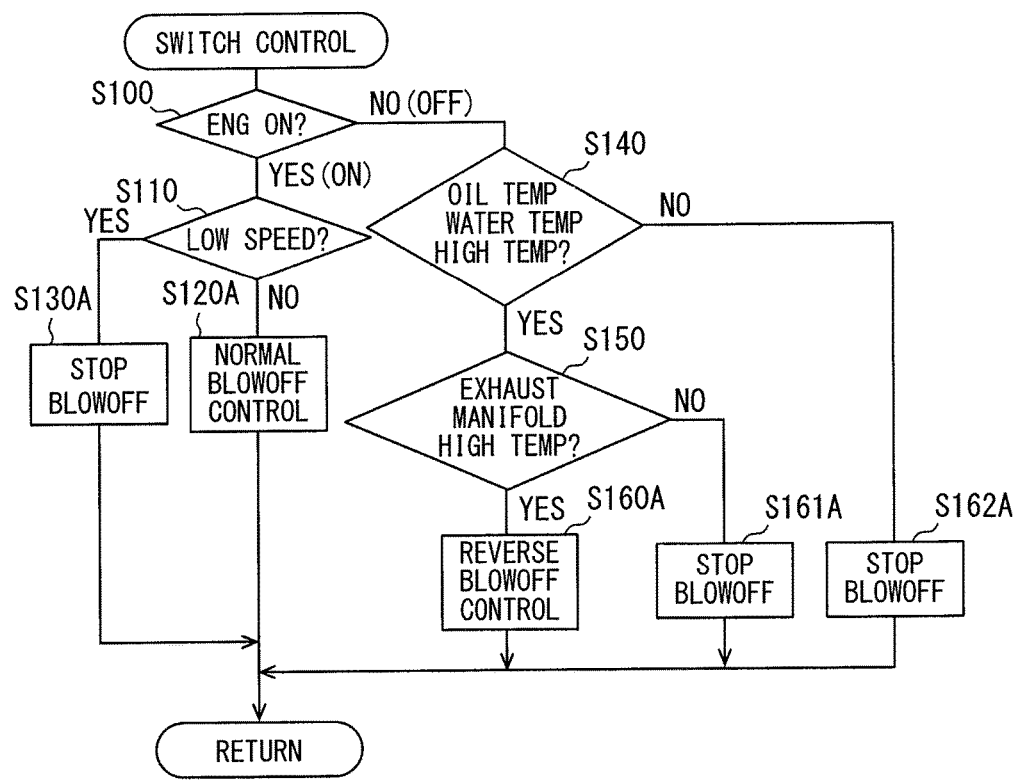
FIG. 17 is a flowchart illustrating switching control processing to be executed by an electronic control unit according to the modification.

FIG. 17 is a flowchart of the switching control processing. The electronic control unit 90 executes the switching control processing in accordance with the flowchart of FIG. 17. The same components in FIG. 17 as those in FIG. 5 are given the same reference signs, and the description thereof will not be given here.

First, in S100, it is determined whether the drive engine 3 ("ENG" in FIG. 17) is operating, based on the output signal of the ignition switch 92.

When the ignition switch 92 is turned on, it is determined that the drive engine 3 is operating (ON), that is, the determination in S100 is made as YES.

Next, in S110, it is determined whether the speed of the automobile is less than a predetermined speed, based on the value detected by the vehicle speed sensor 101. When the speed of the automobile is equal to or more than the predetermined speed, it is determined that the speed of the automobile is high, that is, the determination in S110 is made as NO.

In this case, in 5120A, normal blowoff control processing is executed for the switch valve 115. Specifically, the switch valve 115 is controlled to open a portion between the air inlet 111 and the air outlet 112, and to close a portion between the air inlet 111 and the air outlet 112a. In addition, the electric fan 40A is activated.

With the activation of the electric fan 40A, thus, air flow is sucked from the introduction passage 50a into the air blowing structure 110 through the air inlet 111. The sucked air flow is blown through the air passages 113, 114a and is output from the air outlet 112 toward the rear opening 62 of the air passage 60a of the duct 60 (see an arrow Kb). As a result, the air pressure in the air passage 60a decreases.

With this connection, as in the fourth embodiment, dragged air flow is generated to flow into the air passage 60a of the duct 60 while being dragged from surroundings of the front opening 61 as shown with an arrow Ka. Therefore, the dragged air flow and the air flow blown from the air outlet 112 flow into the air passage 60a as shown with an arrow Kc. Accordingly, the quantity of air blown from the rear opening 62 of the duct 60 to the exhaust manifold 5 increases.

In S110, when it is determined that the speed of the automobile is less than the predetermined speed, based on the value detected by the vehicle speed sensor 101, it is determined that the speed of the automobile is low, that is, the determination in S110 is made as YES. In this case, in 5130A, the operation of the electric fan 40A is stopped. Thus, the blowing of air from the air outlet 112a is stopped.

Further, in S100, when the ignition switch 92 is turned off, it is determined that the drive engine 3 stops (OFF), that is, the determination is made as NO. Next, in S140, it is determined whether the drive engine 3 is to be cooled.

It is determined that the drive engine 3 is to be cooled, that is, the determination in S140 is made as YES. Moreover, it is determined that the temperature of the exhaust manifold 5 is high, that is, the determination in S150 is made as YES.

In this case, in 5160A, reverse blowoff control processing is executed for the switch valve 115. Specifically, the switch valve 115 is controlled to open the portion between the air inlet 111 and the air outlet 112a and to close the portion between the air inlet 111 and the air outlet 112. In addition, the electric fan 40A is activated.

With the activation of the electric fan 40A, thus, air flow is sucked from the introduction passage 50a into the air blowing structure 110 through the air inlet 111. The sucked air flow is blown through the air passages 113, 114b, and is output from the air outlet 112a toward the front opening 61 of the air passage 60a of the duct 60. As a result, the air pressure in the air passage 60a decreases.

With this connection, dragged air flow is generated to flow into the air passage 60a of the duct 60 while being dragged from surroundings of the rear opening 62. Therefore, the dragged air flow and the air flow blown from the air outlet 112a flow in the air passage 60a as shown with an arrow Ke. Accordingly, the quantity of air flowing from the rear opening 62 of the duct 60 to the front opening 61 increases.

It is determined in S150 that the temperature of the exhaust manifold 5 is less than the predetermined temperature P1, based on the value detected by the temperature sensor 100, that is, the determination in S150 is made as NO. In this case, in S161A, the operation of the electric fan 40A is stopped. Thus, the blowing of air from the air outlet 112a is stopped.

Further, when it is determined in S140 that drive engine 3 is not to be cooled, that is, when the determination in S140 is made as NO, the operation of the electric fan 40A is stopped in S162A. Thus, the blowing of air from the air outlet 112a is stopped.

Next, a description will be given of the specific operation of the cooling module 10 according to the present modification.

First, in the state where the automobile is travelling, as in the fourth embodiment, a portion of the air flow passing from the front side of the automobile in the vehicle longitudinal direction, through the front grille opening 2, the condenser 20, the radiator 30, and the introduction passage 50a is introduced into the duct 60 through the front opening 61, and is blown toward the exhaust manifold 5 through the rear opening 62.

Further, the switch valve 115 is controlled to open the portion between the air inlet 111 and the air outlet 112 and to close the portion between the air inlet 111 and the air outlet 112a. In addition, the electric fan 40A is activated (S120A).

In this case, as described above, the air flow sucked from the introduction passage 50a through the air inlet 111 is blown through the air passages 113, 114a and is discharged from the air outlet 112 to the air passage 60a of the duct 60. This reduces the air pressure in the air passage 60a to increase the quantity of air flowing from the rear opening 62 of the duct 60 toward the exhaust manifold 5.

In the state where the drive engine 3 stops, with the operation of the electric fan 40, the air flow sucked from the exhaust manifold 5 is blown to the introduction passage 50a through the duct 60. Then, the blown air flow is sucked to the electric fan 40. This can move the air flow heated by the exhaust manifold 5, the catalyzer, and the turbocharger turbine, to the electric fan 40 through the duct 60.

Further, the switch valve 115 is controlled to close the portion between the air inlet 111 and the air outlet 112 and to open the portion between the air inlet 111 and the air outlet 112a. In addition, the electric fan 40A is activated (S120A).

In this case, as described above, the air flow sucked from the introduction passage 50a through the air inlet 111 is blown through the air passages 113, 114a and is discharged from the air outlet 112a to the air passage 60a of the duct 60. Thus, the quantity of air flowing from the rear opening 62 of the duct 60 to the front opening 61 increases.

In the present modification described above, in the state where the drive engine 3 stops, the electronic control unit 90 controls the switch valve 115 such that the switch valve 115 closes the portion between the air inlet 111 and the air outlet 112 and opens the portion between the air inlet 111 and the air outlet 112a. This increases the quantity of air flow that is sucked from the exhaust manifold 5 into the duct 60 through the rear opening 62 and is blown from the front opening 61. Therefore, hot air heated by the exhaust manifold 5 and the like can be reliably transferred from the exhaust manifold 5 to the introduction passage 50a. Thus, the air flow passing the radiator 30 can cool the exhaust manifold 5 and the like while cooling the radiator 30.

In the state where the automobile is travelling, the electronic control unit 90 controls the switch valve 115 such that the switch valve 115 opens the portion between the air inlet 111 and the air outlet 112 and closes the portion between the air inlet 111 and the air outlet 112a. As a result, the quantity of air blown from the rear opening 62 of the duct 60 to the exhaust manifold 5 increases. This can blow the air flow to cool the exhaust manifold 5 and the like.

Fifth Embodiment

In the fourth embodiment, the air blowing structure 110 is provided to increase the quantity of air flowing through the duct 60. Alternatively, as illustrated in FIG. 18, in a fifth embodiment, the electric fan 40A is arranged in the duct 60.

Figure 18:
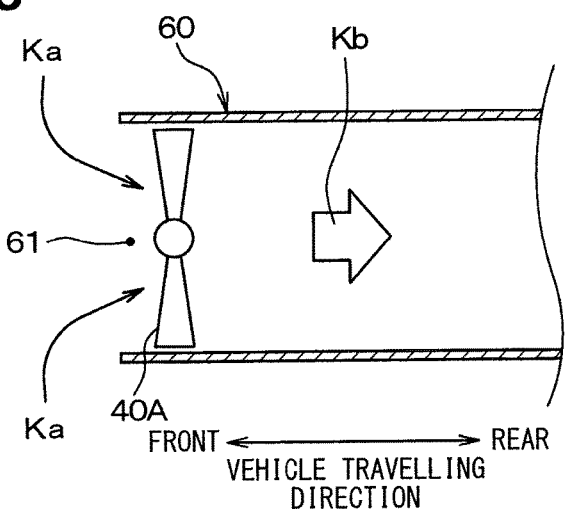
FIG. 18 illustrates inside of a duct according to a fifth embodiment.

FIG. 18 is a sectional view illustrating the duct 60 of the cooling module 10 according to the present embodiment.

In the cooling module 10 according to the present embodiment, the air blowing structure 110 is omitted, and the electric fan 40A is arranged near the front opening 61 of the duct 60. The electric fan 40A sucks air from the introduction passage 50a into the duct 60 through the front opening 61, thereby generating air flow flowing through the air passage 60a of the duct 60.

Therefore, when the electric fan 40A is activated, the quantity of air flowing into the air passage 60a of the duct 60 from the introduction passage 50a through the front opening 61 can be increased. Accordingly, the quantity of air blown from the rear opening 62 of the duct 60 to the exhaust manifold 5 can be increased. In addition, as in the fourth embodiment, the electronic control unit 90 according to the present embodiment controls the electric fans 40, 40A. For this reason, as in the fourth embodiment, the region rear of drive engine 3 (e.g., the exhaust manifold 5, the catalyzer, the turbocharger turbine) can be reliably cooled with the air flow.

Sixth Embodiment

In the fifth embodiment, the electric fan 40A is arranged near the front opening 61 of the duct 60. Alternatively, in a sixth embodiment, the electric fan 40A is arranged near the rear opening 62 of the duct 60.

FIG. 19 is a sectional view illustrating the duct 60 of the cooling module 10 according to the present embodiment.

In the cooling module 10 according to the present embodiment, the air blowing structure 110 is omitted, and the electric fan 40A is arranged near the rear opening 62 of the duct 60. The electric fan 40A blows air from the rear opening 62 to the region rear of the drive engine 3 in the vehicle-travelling direction, thereby generating air flow flowing into the air passage 60a of the duct 60 from the introduction passage 50a through the front opening 61. Thus, when the electric fan 40A is activated, the quantity of air flowing into the air passage 60a of the duct 60 from the introduction passage 50a through the front opening 61 can be increased.

In addition, as in the fourth embodiment, the electronic control unit 90 according to the present embodiment controls the electric fans 40, 40A. For this reason, as in the fourth embodiment, the region rear of the drive engine 3 (e.g., the exhaust manifold 5, the catalyzer, the turbocharger turbine) can be reliably cooled with the air flow.

Other Embodiments

In the first to third embodiments, the valve 70 that opens and closes the air passage 60a of the duct 60 is provided. Alternatively, the valve 70 may be omitted.

In the first to third embodiments, the valve 70 is provided near the front opening 61 of the duct 60. Alternatively, the valve 70 may be provided between the openings 61, 62 of the duct 60, or may be provided near the rear opening 62 of the duct 60.

In the first to third embodiments, the electric fan 40 is activated in the state where the drive engine 3 is operating. In addition, the electric fan 40 may be stopped when the speed of the automobile is equal to or more than a predetermined speed.

In the first to third embodiments, the water temperature sensor 102 that detects the temperature of the engine cooling water and the oil temperature sensor 103 that detects the temperature of the engine oil are used as a sensor that detects the temperature of the thermal medium for cooling the drive engine 3. Alternatively, the following configuration may be adopted. That is, one of the water temperature sensor 102 and the oil temperature sensor 103 may be used.

For example, in making the determination in S140 using the water temperature sensor 102, when the temperature of the engine cooling water is equal to or more than a predetermined temperature, it is determined that the drive engine 3 is to be cooled, that is, the determination in S140 is made as YES. When the temperature of the engine cooling water is less than the predetermined temperature, it is determined that the drive engine 3 is not to be cooled, that is, the determination in S140 is made as NO.

In making the determination in S140 using the value detected by the oil temperature sensor 103, when the temperature of the engine oil is equal to or more than a predetermined temperature, it is determined that the drive engine 3 is to be cooled, that is, the determination in S140 is made as YES. When the temperature of the engine oil is less than the predetermined temperature, it is determined that the drive engine 3 is not to be cooled, that is, the determination in S140 is made as NO.

In the first to sixth embodiments, the radiator 30 that cools the engine cooling water as the thermal medium is used as a vehicle-mounted heat exchanger. Alternatively, an oil cooler that cools the engine oil as the thermal medium may be used.

In the first to sixth embodiments, the duct 60 may be arranged to extend in the vehicle width direction of the drive engine 3. Alternatively, the duct 60 may be arranged above the drive engine 3 in the vertical direction.

In the first to third embodiments, in S160 in FIGS. 5 and 8, the degree of opening of the valve 70 is set constant. Alternatively, the electric motor 80 is controlled based on the temperature detected by the temperature sensor 100, to control the degree of opening of the valve 70. In this case, as the temperature of the exhaust manifold 5 becomes higher, the degree of opening of the valve 70 may be gradually increased.

In the first to sixth embodiments, both the electric fan 40 and the valve 70 are controlled using the common electronic control unit 90. Alternatively, the electric fan 40 and the valve 70 may be controlled using different electronic control units.

In the first to third embodiments, the electronic control unit 90 automatically opens and closes the valve 70. Alternatively, the valve 70 may be manually opened and closed.

In the first to sixth embodiments, the front grille opening 2 is provided front of the radiator 30 in the vehicle-travelling direction. Alternatively, the following configuration may be adopted. That is, the front grille opening 2 may be offset from the radiator 30 in the vehicle width direction while the front grille opening 2 communicates with the front engine room 1 on the front side of the front grille 4 in the vehicle-travelling direction.

In the first to sixth embodiments, the front opening is the front grille opening 2 formed in the front grille 4. Alternatively, the front opening may be formed in any site other than the front grille 4 of the automobile. That is, the front opening may be arranged in site other than the front side of the front engine room 1 in the vehicle-travelling direction. For example, the front opening may be formed in a trunk lid that covers the front engine room 1 from above in the vertical direction.

In the first to third embodiments, the temperature sensor 100 detects the temperature of the surface of the exhaust manifold 5 as the temperature of the exhaust manifold 5. However, the following configuration may be adopted.

That is, the temperature sensor 100 may detect the internal temperature of the exhaust manifold 5 as the temperature of the exhaust manifold 5. Alternatively, the temperature sensor 100 may detect the temperature around the exhaust manifold 5 as the temperature of the exhaust manifold 5.

Alternatively, the temperature sensor 100 is arranged in the duct 60 to detect the internal temperature of the duct 60. The detected temperature may be regarded as the temperature of the exhaust manifold 5. In this case, it is preferred that the temperature sensor 100 detects the temperature on the side of the rear opening 62 of the duct 60. That is, in place of the temperature of the exhaust manifold 5, the temperature of air in the duct 60 is detected.

In the third embodiment, the holes 60c, 60d are arranged above the components to be cooled, in the vertical direction. Alternatively, the holes 60c, 60d may be arranged in the vehicle width direction with respect to the components to be cooled.

In the third embodiment, the two holes (60c, 60d) are used as holes opened from the inside of the air passage to the outside of the duct 60. Alternatively, the number of holes opened from the inside of the air passage to the outside of the duct 60 may be one or two. Further, the number of holes may be three or more.

In the first to sixth embodiments and the modifications, the vehicle speed sensor 101 is the sensor for detecting the speed of the automobile as the rotational speed of the driving wheels of the automobile. Alternatively, the following configuration may be adopted.

A flow rate sensor for detecting the speed of air flowing in the duct 60 is adopted, and the speed of the automobile is detected based on the flow rate detected by the flow rate sensor. That is, the flow rate sensor that is the vehicle speed sensor 101 detects the speed of the air flow in the duct 60, in place of the speed of the automobile.

In the first to sixth embodiments, the duct 60 may have the following configurations (1), (2), (3), (4), and (5).

(1) As illustrated in FIG. 20, the duct 60 also serves as an engine cover 120 that covers the drive engine 3 from above in the vertical direction.

Figure 21:
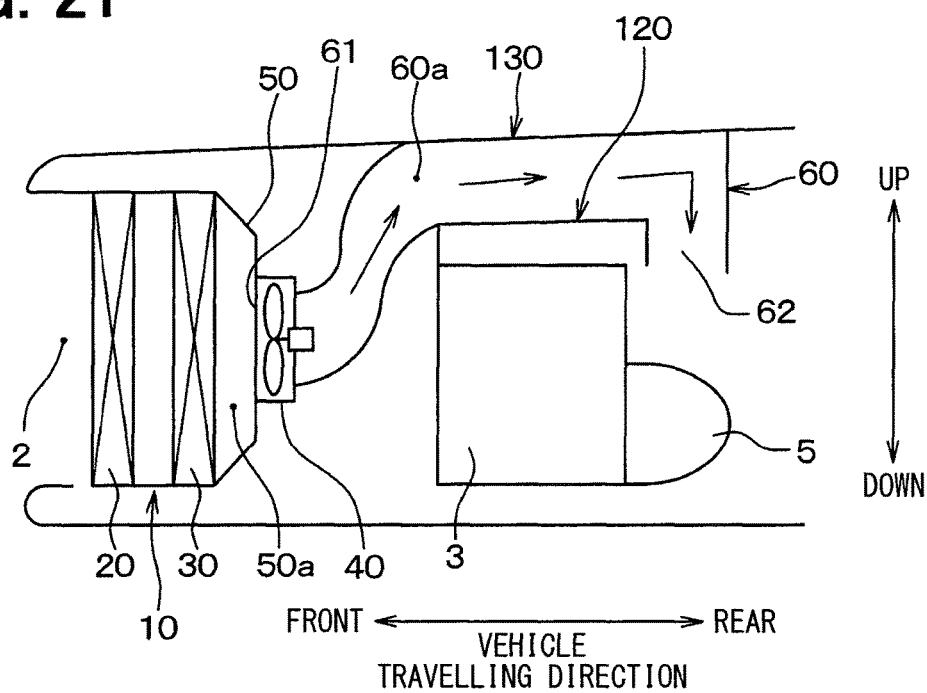
FIG. 21 illustrates a cooling module according to a second modification.

(2) As illustrated in FIG. 21, the duct 60 is configured of a trunk lid (i.e., a hood) 130 that closes the front engine room 1, and the engine cover 120 that covers the drive engine 3 from above in the vertical direction.

In this case, the trunk lid 130 configures the upper side of the duct 60 in the vertical direction. The engine cover 120 configures the lower side of the duct 60 in the vertical direction. The section of the duct 60 other than the upper side and the lower side in the vertical direction is configured of a member other than the trunk lid 130 and the engine cover 120.

Figure 22:
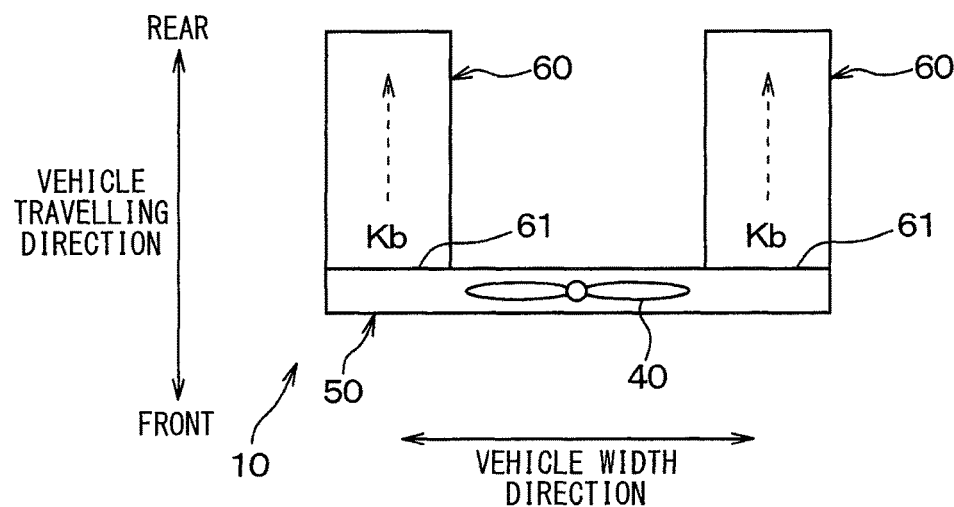
FIG. 22 illustrates a cooling module according to a third modification.

(3) As illustrated in FIG. 22, two ducts 60 sandwich the electric fan 40 therebetween in the vehicle width direction. Specifically, one of the two ducts 60 is arranged at the right of the electric fan 40 in the vehicle width direction, and the other duct 60 is arranged at the left of the electric fan 40 in the vehicle width direction. Front openings 61 of the two ducts 60 are opened to the radiator 30.

Figure 23:
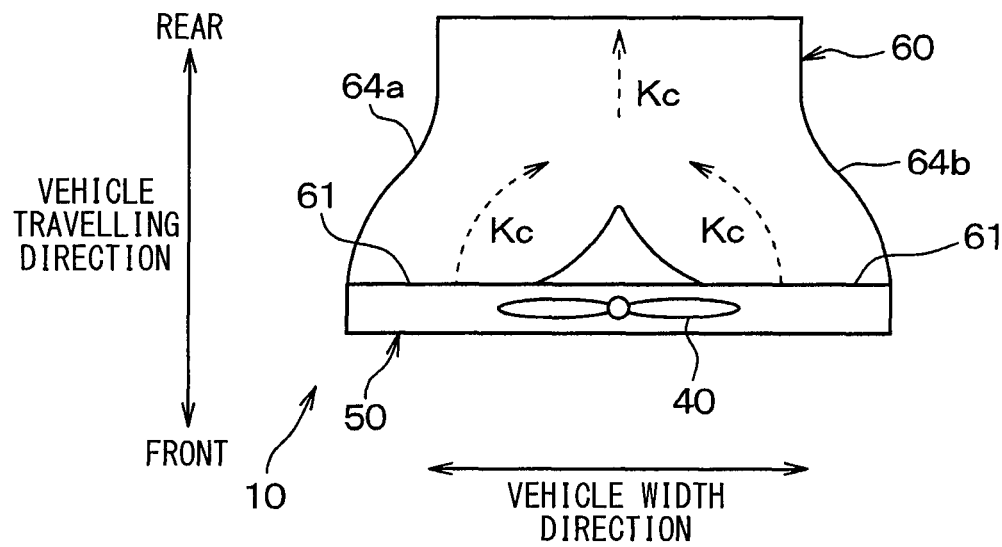
FIG. 23 illustrates a cooling module according to a fourth modification.

(4) As illustrated in FIG. 23, the duct 60 includes two front openings 61 and one rear opening 62.

Specifically, the duct 60 includes branch ducts 64a, 64b. The branch ducts 64a, 64b each have a front opening 61. Air outlets of the branch ducts 64a, 64b are joined with each other and connected to the rear opening 62. That is, the branch ducts 64a, 64b are joined and connected to the rear opening 62. Therefore, the branch ducts 64a, 64b allow air flow sucked from the respective front openings 61 to be joined as shown with an arrow Kc, and guide the joined air flow to the rear opening 62. In this case, three or more front openings 61 (i.e., branch ducts (64a, 64b)) may be provided in the duct 60.

Figure 24:
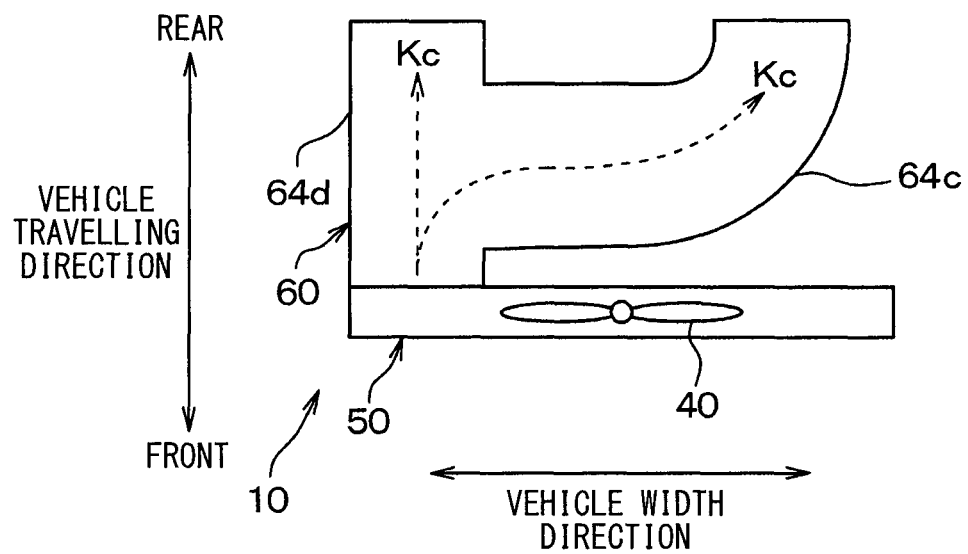
FIG. 24 illustrates a cooling module according to a fifth modification.

(5) As illustrated in FIG. 24, the duct 60 includes one front opening 61 and two rear openings 62.

Specifically, the duct 60 includes branch ducts 64d, 64c. The branch ducts 64d, 64c each have a rear opening 62. Air inlets of the branch ducts 64d, 64c are joined with each other and connected to the front opening 61. That is, the branch ducts 64d, 64c are joined and connected to the front opening 61.

In this case, the branch ducts 64c, 64d divide air flow sucked from the one front opening 61 as shown with an arrow Kc, and guide the air flow to the respective rear openings 62. Three or more rear openings 62 (i.e., branch ducts (64d, 64c)) may be formed in the duct 60.

In the third embodiment, the holes 60c, 60d (see FIG. 10) as blowing portions are formed in the duct 60 of the first embodiment to cool components to be cooled other than the exhaust manifold 5. Alternatively, the holes 60c, 60d (see FIG. 10) may be formed in the duct 60 of the fourth, fifth, and sixth embodiments, such that air is blown to cool components to be cooled other than the rear side (e.g., the exhaust manifold 5) of the drive engine 3.

The holes 60c, 60d are opened from the air passage 60a to the outside of the duct 60 between the openings 61, 62 of the duct 60. The holes 60c, 60d are opened to the site other than the rear side relative to the drive engine 3. Therefore, air flow is blown to the site in the engine room other than the rear side relative to the drive engine 3, to cool the site. In this case, the number of holes (60c, 60d) formed in the duct 60 is not limited.

In the third, fourth, fifth, and sixth embodiments, the holes (60c, 60d) as blowing portions are provided in the duct 60. Alternatively, branch ducts as blowing portions may be formed in the duct 60. In this case, air flow in the air passage 60a of the duct 60 can be blown to a desired site in the front engine room 1 through the branch ducts. Therefore, the rear side of the front engine room 1 relative to the drive engine 3 in the vehicle-travelling direction as well as the entire front engine room 1 can be cooled. In this case, the number of the branch ducts is not limited.

In the fourth embodiment and its modification, the air blowing structure 110 is provided near the front opening 61 of the duct 60. Alternatively, the air blowing structure 110 may be provided at site other than the site near the front opening 61 of the duct 60, while the air blowing structure 110 blows air to the area between the front opening 61 and the rear opening 62 of the duct 60. For example, the air blowing structure 110 may be provided between the openings 61, 62 of the duct 60, or may be provided near the rear opening 62 of the duct 60.

In the first to sixth embodiments, the cooling device is applied to the automobile in which the exhaust manifold 5 is arranged rear of the drive engine 3 in the front engine room 1 in the vehicle-travelling direction. Alternatively, the cooling device may be applied to the automobile in which the exhaust manifold 5 is arranged at other place other than the rear side in the front engine room 1 relative to the drive engine 3 in the vehicle-travelling direction. That is, in implementing the cooling device, the exhaust manifold 5 may be arranged in any location in the front engine room 1.

In the fourth to sixth embodiments, the axial fan is used as the electric fan 40A. Alternatively, various fans other than the axial fan (e.g., a centrifugal fan) may be used.

In the fourth to sixth embodiments, the valve 70 in the first to third embodiments is omitted, but the valve 70 in the first to third embodiments may be used.

In the fourth to sixth embodiments, the determinations in S310, S330 in FIG. 15 are made based on the temperature of the cooling water passing through the radiator 30. Alternatively, the determinations in S310, S330 in FIG. 15 may be made based on the temperature of engine oil passing through the oil cooler.

In the fourth to sixth embodiments, the temperature sensor 105 detects the temperature of air in the front engine room 1 as the temperature in the front engine room 1. Alternatively, the temperature sensor 105 may detect the temperature of the exhaust manifold 5 or the like, and the determinations in S350, S370, and S390 may be made based on the detected temperature.

The present disclosure is not limited to the foregoing embodiments, and can be modified as appropriate within the scope of claims. The foregoing embodiments are not unrelated to each other, and can be combined as appropriate with each other except that the combination is obviously impossible. As a matter of course, the components in the foregoing embodiments are not essential except that the components are explicitly essential or theoretically essential.

A speed determination part corresponds to S110, a first control part corresponds to S120, and a second control part corresponds to S130. A first temperature determination part corresponds to S190, a third control part corresponds to S191, and a stop determination part corresponds to S100. An engine determination part corresponds to S140, a second temperature determination part corresponds to S150, and a fourth control part corresponds to S161. A fifth control part corresponds to S162, and a sixth control part corresponds to S160. A first air-blowing control part corresponds to S320, a second air-blowing control part corresponds to S340, and a third air-blowing control part corresponds to S360. A fourth air-blowing control part corresponds to S380, and a fifth air-blowing control part corresponds to S400. A third temperature sensor corresponds to the temperature sensor 105, a first switch control part corresponds to S120A, and a second switch control part corresponds to S160A.

The invention claimed is:

1. A cooling device for an automobile that includes a front opening opened in a front engine room on a front side in a travelling direction, a first air blower arranged in the front engine room on a front side of a drive engine in the travelling direction, and an introduction passage for guiding, toward the first air blower, air to flow from the front side of the front opening in the travelling direction through the front opening, the cooling device being configured to cool the drive engine with the air flow passing from the introduction passage to the drive engine via the first air blower, the cooling device comprising:
a duct having a first opening opened in the introduction passage and a second opening opened to rear of the drive engine in the travelling direction in the front engine room, wherein the duct forms an air passage for air to flow between the first opening and the second opening,
in a state where the drive engine stops, the duct blows out, with the operation of the first air blower, the air flow sucked from a rear side of the front engine room relative to the drive engine in the travelling direction through the second opening, into the introduction passage through the first opening.

2. The cooling device according to claim 1, wherein the first opening is opened in the air passage to the front side in the travelling direction.

3. The cooling device according to claim 1, wherein the duct has a blowing portion between the first opening and the second opening to blow off air flow from the air passage to outside of the duct.

4. The cooling device according to claim 1, further comprising
a valve that opens and closes the air passage.

5. A cooling module for an automobile including an exhaust manifold arranged rear of the drive engine in a travelling direction in the front engine room, the cooling module comprising:
the cooling device according to claim 4; and
a heat exchanger arranged on an upstream side of the introduction passage relative to the first air blower in an air-flowing direction, and configured to emit heat from a thermal medium for cooling the drive engine, into the air flow in the introduction passage, wherein
the first opening is opened on a downstream side of the introduction passage relative to the heat exchanger in the air-flowing direction.

6. The cooling module according to claim 5 further comprising:
a speed determination part that determines whether a speed of the automobile is equal to or more than a threshold, based on a value detected by a speed sensor for detecting the speed of the automobile; and
a first control part that causes the valve to open the air passage when the speed determination part determines that the speed of the automobile is equal to or more than the threshold.

7. The cooling module according to claim 6 further comprising:
a second control part that causes the valve to close the air passage when the speed determination part determines that the speed of the automobile is less than the threshold.

8. The cooling module according to claim 7 further comprising:
a first temperature determination part that determines whether a temperature of the exhaust manifold is equal to or more than a predetermined value, based on a value detected by a first temperature sensor for detecting the temperature of the exhaust manifold; and
a third control part that causes the valve to increase an opening degree of the valve as the temperature of the exhaust manifold becomes higher, when the speed determination part determines that the speed of the automobile is less than the threshold and when the first temperature determination part determines that the temperature of the exhaust manifold is equal to or more than the predetermined value.

9. The cooling module according to claim 5 further comprising:
a stop determination part that determines whether the drive engine stops;
an engine determination part that determines whether the drive engine is to be cooled, based on a value detected by a second temperature sensor for detecting a temperature of the thermal medium;
a second temperature determination part that determines whether a temperature of the exhaust manifold is equal to or more than a predetermined value, based on a value detected by a first temperature sensor for detecting the temperature of the exhaust manifold; and
a fourth control part that causes the valve to close the air passage when the stop determination part determines that the drive engine stops, when the engine determination part determines that the drive engine is to be cooled, and when the second temperature determination part determines that the temperature of the exhaust manifold is less than the predetermined value.

10. The cooling module according to claim 9 further comprising:
a fifth control part that causes the valve to open the air passage when the stop determination part determines that the drive engine stops and when the engine determination part determines that the drive engine is not to be cooled.

11. The cooling module according to claim 10 further comprising:
a sixth control part that causes the valve to open the air passage when the stop determination part determines that the drive engine stops, when the engine determination part determines that the drive engine is to be cooled, and when the second temperature determination part determines that the temperature of the exhaust manifold is equal to or more than the predetermined value.

12. The cooling module according to claim 11, wherein the sixth control part controls the valve such that the opening degree of the valve is made smaller, as compared with the fifth control part.

13. The cooling device according to claim 1 further comprising:
a second air blower located adjacent to the first opening of the duct, the second air blower sucking an air flow from the introduction passage into the duct through the first opening, and blowing off the sucked air flow toward the second opening.

14. The cooling device according to claim 1 further comprising:
a second air blower located adjacent to the second opening of the duct, the second air blower blowing off an air flow from the second opening, which is sucked from the introduction passage into the duct through the first opening.

15. The cooling device according to claim 1, wherein the duct is formed of a trunk lid that closes the front engine room, and an engine cover that covers the drive engine from above in a vertical direction.

16. The cooling device according to claim 1, wherein the duct is configured to serve as an engine cover that covers the drive engine from above in a vertical direction.

17. The cooling device according to claim 1, wherein the duct has a first duct and a second duct, and
the first duct and the second duct are arranged to sandwich the first air blower.

18. The cooling device according to claim 1, wherein the duct has a plurality of branch ducts each having the first opening, and
the plurality of branch ducts are joined with each other at air outlets, and is connected to the second opening.

19. The cooling device according to claim 1, wherein the duct has a plurality of branch ducts each having the second opening, and
the first opening is connected to air inlets of the plurality of branch ducts joined with each other.

20. The cooling device according to claim 1 further comprising: a sensor that detects a speed of the air flow in the duct, as an alternative of the speed of the automobile.

21. The cooling device according to claim 1 further comprising: a sensor that detects a temperature in the duct, as an alternative of a temperature on a rear side of the front engine room relative to the drive engine in the travelling direction.

22. The cooling module according to claim 5, wherein the heat exchanger is a radiator that emits heat of cooling water to the air flow in the introduction passage, the cooling water being the thermal medium for cooling the drive engine.

23. A cooling device for an automobile that includes a front opening opened in a front engine room on a front side in a travelling direction, a first air blower arranged in the front engine room on a front side of a drive engine in the travelling direction, and an introduction passage for guiding, toward the first air blower, air to flow from the front side of the front opening in the travelling direction through the front opening, the cooling device being configured to cool the drive engine with the air flow passing from the introduction passage to the drive engine via the first air blower, the cooling device comprising:
a duct having a first opening opened in the introduction passage and a second opening opened to rear of the drive engine in the travelling direction in the front engine room, wherein the duct forms an air passage for air to flow between the first opening and the second opening; and
an air outlet from which an air flow is blown to a region between the first opening and the second opening in the duct, wherein
the air flow blown from the air outlet lowers an air pressure in the region between the first opening and the second opening in the duct, so that an air flow is generated to flow from the first opening to the second opening, and
the generated air flow and the air flow blown from the air outlet flow toward the second opening.

24. The cooling device according to claim 23 further comprising:
a second air blower that generates the air flow blown from the air outlet to the region between the first opening and the second opening in the duct.

25. A cooling device for an automobile that includes a front opening opened in a front engine room on a front side in a travelling direction, a first air blower arranged in the front engine room on a front side of a drive engine in the travelling direction, and an introduction passage for guiding, toward the first air blower, air to flow from the front side of the front opening in the travelling direction through the front opening, the cooling device being configured to cool the drive engine with the air flow passing from the introduction passage to the drive engine via the first air blower, the cooling device comprising:
a duct having a first opening opened in the introduction passage and a second opening opened to rear of the drive engine in the travelling direction in the front engine room, wherein the duct forms an air passage for air to flow between the first opening and the second opening;
a first air outlet and a second air outlet from which an air flow sucked from an air inlet is blown to a region between the first opening and the second opening in the duct, wherein
the air flow blown from the first air outlet lowers an air pressure in the region between the first opening and the second opening in the duct, so that an air flow is generated to flow from the first opening to the second opening, and the generated air flow and the air flow blown from the first air outlet flow toward the second opening, and
the air flow blown from the second air outlet lowers an air pressure in the region between the first opening and the second opening in the duct, so that an air flow is generated to flow from the second opening to the first opening, and the generated air flow and the air flow blown from the second air outlet flow toward the first opening; and
a switch valve that opens a portion between one of the first and second air outlets and the air inlet, and that closes a portion between the other one of the first and second air outlets and the air inlet.

26. The cooling device according to claim 25 further comprising:
a second air blower that generates the air flows blown from the first and second air outlets to the region between the first opening and the second opening in the duct.

27. A cooling module comprising:
a cooling device for an automobile that includes a front opening opened in a front engine room on a front side in a travelling direction, a first air blower arranged in the front engine room on a front side of a drive engine in the travelling direction, and an introduction passage for guiding, toward the first air blower, air to flow from the front side of the front opening in the travelling direction through the front opening, the cooling device being configured to cool the drive engine with the air flow passing from the introduction passage to the drive engine via the first air blower, the cooling device comprising:
   a duct having a first opening opened in the introduction passage and a second opening opened to rear of the drive engine in the travelling direction in the front engine room, wherein the duct forms an air passage for air to flow between the first opening and the second opening; and
   a second air blower located adjacent to the first opening of the duct, the second air blower sucking an air flow from the introduction passage into the duct through the first opening, and blowing off the sucked air flow toward the second opening; and
   a heat exchanger arranged on an upstream side of the introduction passage relative to the first air blower in the air-flowing direction, the heat exchanger emitting heat from a thermal medium for cooling the drive engine, to air flow in the introduction passage, wherein
the first opening is opened on a downstream side of the introduction passage relative to the heat exchanger in the air-flowing direction.

28. The cooling module according to claim 27 further comprising:
   a first air-blowing control part that activates the first air blower of the first and second air blowers when it is determined that a temperature of the thermal medium is equal to or more than a first temperature and is less than a second temperature, based on a value detected by a second temperature sensor for detecting the temperature of the thermal medium, in the state where the drive engine is operating; and
   a second air-blowing control part that activates each of the first air blower and the second air blower when it is determined that the temperature of the thermal medium is equal to or more than the second temperature, based on a value detected by the second temperature sensor, in the state where the drive engine is operating.

29. The cooling module according to claim 27 further comprising:
   a third air-blowing control part that activates the second air blower of the first and second air blowers when it is determined that a temperature in the front engine room is equal to or more than a third temperature and is less than a fourth temperature, based on a value detected by a third temperature sensor for detecting the temperature in the front engine room, in the state where the drive engine stops;
   a fourth air-blowing control part that activates the first air blower of the first and second air blowers when it is determined that the temperature in the front engine room is equal to or more than the fourth temperature and is less than a fifth temperature, based on the value detected by the third temperature sensor, in the state where the drive engine stops; and
   a fifth air-blowing control part that activates the first air blower and the second air blower when it is determined that the temperature in the front engine room is equal to or more than the fifth temperature, based on the value detected by the third temperature sensor, in the state where the drive engine stops.

30. A cooling module comprising:
the cooling device according to claim 25;
   a first switch control part that causes the switch valve to open the portion between the second air outlet and the air inlet in the state where the drive engine stops;
   a speed determination part that determines whether a speed of the automobile is equal to or more than a threshold, based on a value detected by a speed sensor for detecting the speed of the automobile; and
   a second switch control part that causes the switch valve to open the portion between the first air outlet and the air inlet when the speed determination part determines that the speed of the automobile is equal to or more than the threshold.

* * * * *